(12) United States Patent
Daly et al.

(10) Patent No.: US 11,260,726 B2
(45) Date of Patent: Mar. 1, 2022

(54) GRAVITY INDEPENDENT PRESSURE RELIEF VALVE

(71) Applicant: ILLINOIS TOOL WORKS INC., Glenview, IL (US)

(72) Inventors: Erin Michael Daly, Windsor (CA); Lisa Jean Aab, Flint, MI (US)

(73) Assignee: Illinois Tool Works Inc., Glenview, IL (US)

( * ) Notice: Subject to any disclaimer, the term of this patent is extended or adjusted under 35 U.S.C. 154(b) by 166 days.

(21) Appl. No.: 16/383,145

(22) Filed: Apr. 12, 2019

(65) Prior Publication Data

US 2019/0315198 A1    Oct. 17, 2019

Related U.S. Application Data

(60) Provisional application No. 62/656,746, filed on Apr. 12, 2018.

(51) Int. Cl.
*B60H 1/24* (2006.01)
*F16K 17/02* (2006.01)

(52) U.S. Cl.
CPC ............ *B60H 1/249* (2013.01); *F16K 17/02* (2013.01)

(58) Field of Classification Search
CPC ............................... B60H 1/249; F16K 17/02
USPC ...................................................... 454/339
See application file for complete search history.

(56) References Cited

U.S. PATENT DOCUMENTS

| | | | | |
|---|---|---|---|---|
| 3,448,766 A | * | 6/1969 | Schüle | F16K 15/148 137/854 |
| 3,473,561 A | * | 10/1969 | Svenson | F16K 15/148 137/854 |
| 3,905,392 A | | 9/1975 | Gray | |
| 2005/0098215 A1 | | 5/2005 | Call et al. | |
| 2011/0005616 A1 | | 1/2011 | Berglund | |

FOREIGN PATENT DOCUMENTS

| | | |
|---|---|---|
| DE | 3601853 A1 | 8/1987 |
| DE | 19517157 A | 4/1996 |
| DE | 102009026222 A1 | 2/2011 |
| FR | 2268207 A1 | 11/1975 |
| GB | 1357249 A | 6/1974 |
| JP | S53154543 U | 12/1978 |

OTHER PUBLICATIONS

International Search Report for PCT/US2019/027324, dated Jul. 22, 2019.
Office Action for German Patent Application No. 11 2019 001 896.5, dated Dec. 10, 2021 (6 pages).

* cited by examiner

*Primary Examiner* — Allen R. B. Schult
(74) *Attorney, Agent, or Firm* — Quarles & Brady LLP

(57) ABSTRACT

A pressure relief valve is provided that includes a housing and a flap. The housing includes a plurality of receptacle members with openings therebetween, and the flap is configured to be accepted by the housing and to contact the receptacle members in a closed position. Further, the flap covers the openings and inhibits airflow through the openings in a closed position, and the flap is biasable to allow airflow through the openings in an open position.

8 Claims, 21 Drawing Sheets

GRAVITY INDEPENDENT PRESSURE RELIEF VALVE

CROSS REFERENCE TO RELATED APPLICATIONS

This application is based on, claims priority to, and incorporates herein by reference in its entirety U.S. Provisional Application Ser. No. 62/656,746, filed on Apr. 12, 2018, and entitled "Gravity Independent PRV."

REFERENCE REGARDING FEDERALLY SPONSORED RESEARCH OR DEVELOPMENT

Not applicable

SEQUENCE LISTING

Not applicable

BACKGROUND OF THE INVENTION

1. Field of the Invention

The present disclosure relates generally to pressure relief valves and, more particularly, gravity independent pressure relief valves.

2. Description of the Background of the Invention

The present disclosure relates generally to control systems and pressure relief valves configured for use in enclosed areas, such as an automobile. Many interior compartments and cabins of automobiles and other vehicles typically include vents or pressure relief valves to relieve pressure from within the cabin or interior compartments during operation of the vehicle. These pressure relief valves may also assist with keeping a pressure within the vehicle interior balanced with an exterior, atmospheric pressure. For example, when a door of an automobile is closed or when an air bag is activated within the automobile, such pressure relief valves assist with relieving air pressure from within an interior of the automobile to maintain a desired pressure within the automobile.

In most cases, pressure relief valves employed in automobiles are also one-way valve systems, which allow air to escape an interior of the automobile, but prevent the flow of air or other substances (e.g., water, dust, debris, noise, etc.) from entering the interior of the automobile from the exterior or outside environment. In order to provide a one-way valve system, many traditional pressure relief valves comprise flap components that bias open to release air pressure when prompted by a rise in an air pressure in the interior of a vehicle, but otherwise remain closed, due to gravity. However, such pressure relief valves are sensitive to the particular orientation, mounting angle, or placement within an automobile and the flap components may hang open, in some instances. As such, water, dust, noise, air, etc. may enter into an automobile interior. Further, performance of such valves may also be affected by an angle of orientation of a vehicle or vehicle component, on which the valve is mounted. For instance, if such pressure relief valves are installed incorrectly, gravity may cause the flaps to sway open.

A need therefore exists for a pressure relief valve that functions independently from its particular orientation and independent from gravity. Further, a need exists for a pressure relief valve that is non-specific to its placement within a vehicle. Also, a need exists for a pressure relief valve configured to allow pressure or air to exit an interior of the vehicle, a pressure relief valve configured to prevent undesirable substances from entering the interior of the vehicle, and a pressure relief valve that may be installed into or onto a vehicle in variety of locations and in a variety of orientations.

SUMMARY OF THE INVENTION

In one aspect, a pressure relief valve is provided. The pressure relief valve includes a housing having a plurality of receptacle members with openings therebetween, and a flap configured to be accepted by the housing and to contact the receptacle members in a closed state. Further, the flap covers the openings and inhibits airflow through the openings in the closed position, and is biasable to allow airflow through the openings in an open position.

In related embodiments, the flap may include a flange and a tapered portion extending downwardly from the flange, and the tapered portion of the flap may rest against the receptacle members in the closed position. The housing may also include a flange and, in some embodiments, the flange of the flap may engage the flange of the housing when in the closed position. In some aspects, the flange of the flap may be spatially separated from the flange of the housing in the open position. The flap may also include a plurality of troughs on an interior surface thereof and a distance between the troughs in the closed position may be different than a distance between the troughs in the open position. In further embodiments, the flange of the housing includes a plurality of apertures therethough. The flap may cover the apertures and inhibit airflow through the apertures in the closed position, and the apertures may be exposed in the open position.

In another aspect, a pressure relief valve is provided that includes a housing with an interior rim and a plurality of receptacle members that extend from the interior rim to a central junction, and a flap with a flange, a stem, and a tapered portion between the flange and the stem. The central junction may also include an aperture and the stem may extend through the aperture. Further, the flap is configured to bias between an open position and a closed position.

In some aspects, the pressure relief valve may further comprise a seal coupled to the housing. Additionally, the interior rim and the plurality of receptacle members may define a receiving space and the flap may be at least partially within the receiving space of the housing. The stem may also include a projection and an upper edge of the projection may engage a distal end of the central junction. Further, the interior rim may include a plurality of apertures that may be proximate to the flange of the flap. And, in some embodiments, the flap may further include a plurality of troughs on an interior surface thereof.

In a further aspect, a pressure relief valve is provided that includes a housing and a flap. The housing includes a receptacle member and an opening, and a flap that is at least partially received by the housing. The flap covers the opening and inhibits airflow through the opening in a closed position and is biasable to allow airflow through the opening in an open position. Further, the flap is symmetrical across at least a first axis and a second axis perpendicular to the first axis.

The foregoing and other aspects and advantages of the disclosure will appear from the following description. In the description, reference is made to the accompanying drawings, which form a part hereof, and in which there is shown by way of illustration a preferred configuration of the disclosure. Such configuration does not necessarily represent the full scope of the disclosure, however, and reference is made therefore to the claims herein for interpreting the scope of the disclosure.

BRIEF DESCRIPTION OF THE DRAWINGS

The present disclosure will be better understood and features, aspects, and advantages other than those set forth above will become apparent when consideration is given to the following detailed description thereof. Such detailed description makes reference to the following drawings.

Figure 1:
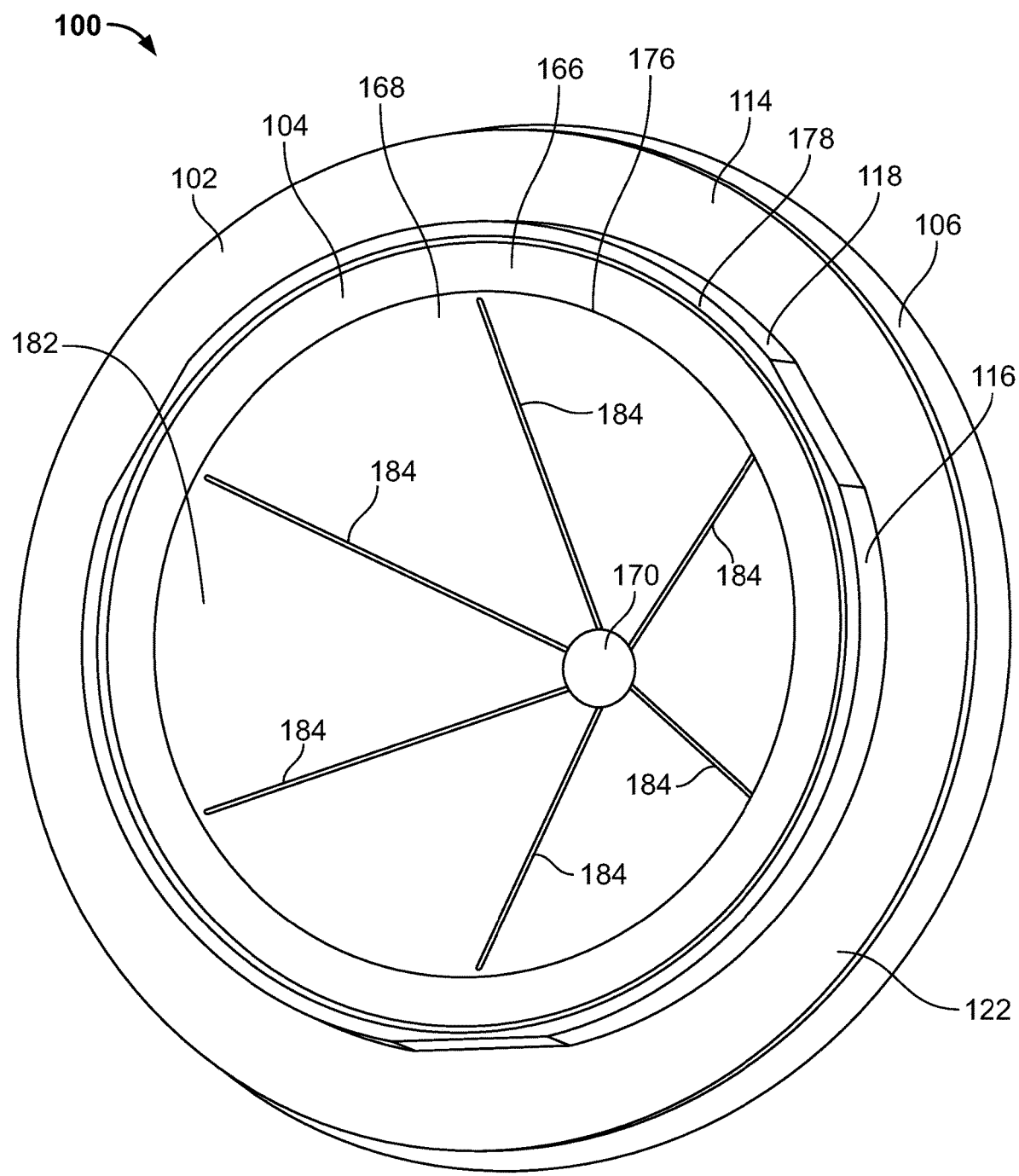
FIG. 1 is a top perspective view of a pressure relief valve (PRV) having a housing, a seal, and a flap, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE DRAWINGS

Certain embodiments of the present disclosure provide pressure relief valves or low profile pressure relief valves. Various embodiments also provide for pressure relief valves that are gravity independent, i.e., pressure relief valves that do not require gravity to hold flaps closed or pressure relief valves that do not require a particular or specific orientation of installation in a vehicle, providing for improved flexibility or versatility when mounting the pressure relief valve. Further embodiments provide gravity independent pressure relief valves that allow pressure or air to pass therethrough, while preventing undesirable substances from passing therethrough, and gravity independent pressure relief valves that provide an airtight seal between the gravity independent pressure relief valve and a component attached therewith.

Figure 3:
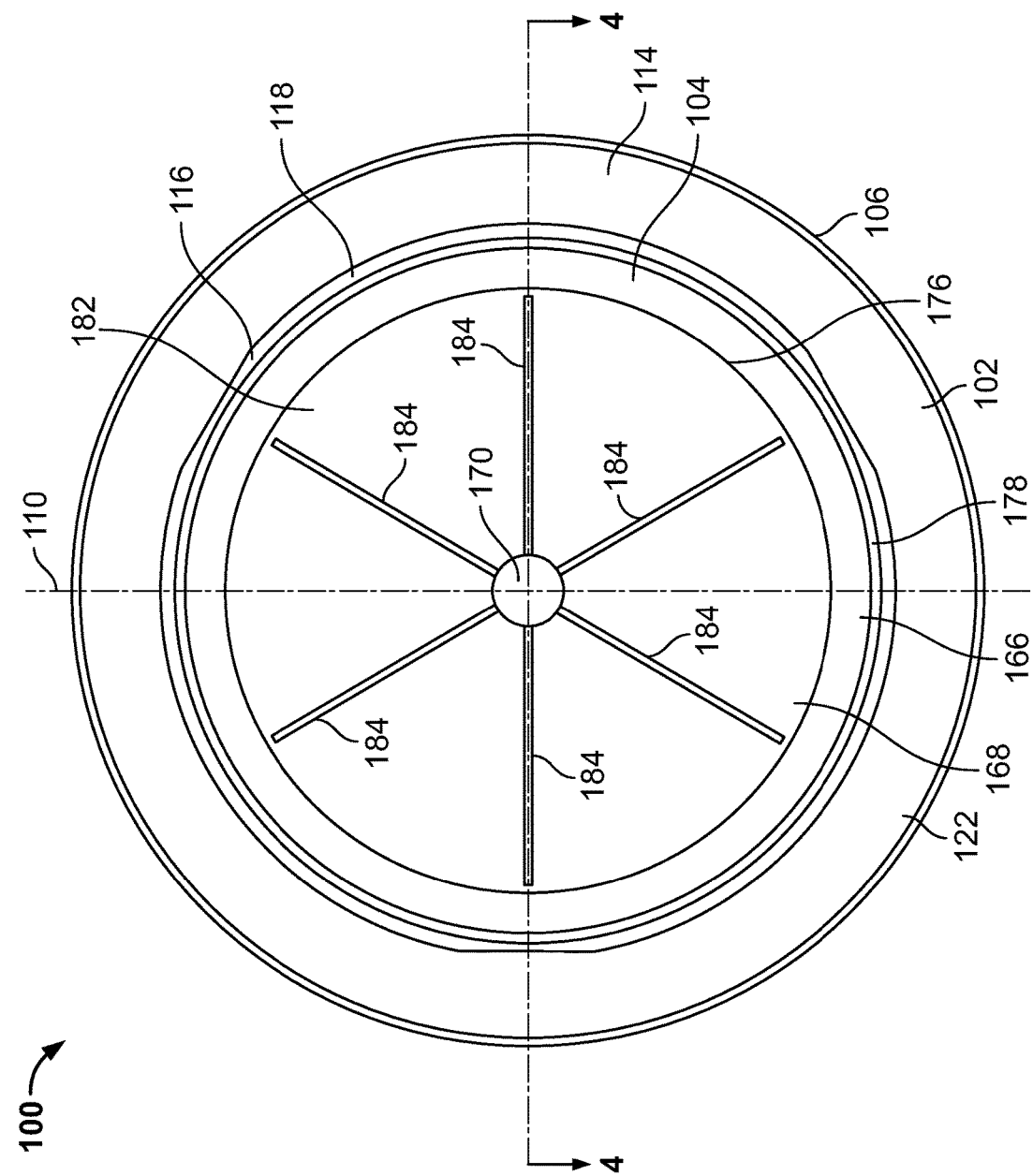
FIG. 3 is a top view of the pressure relief valve of FIG. 1.
Figure 4:
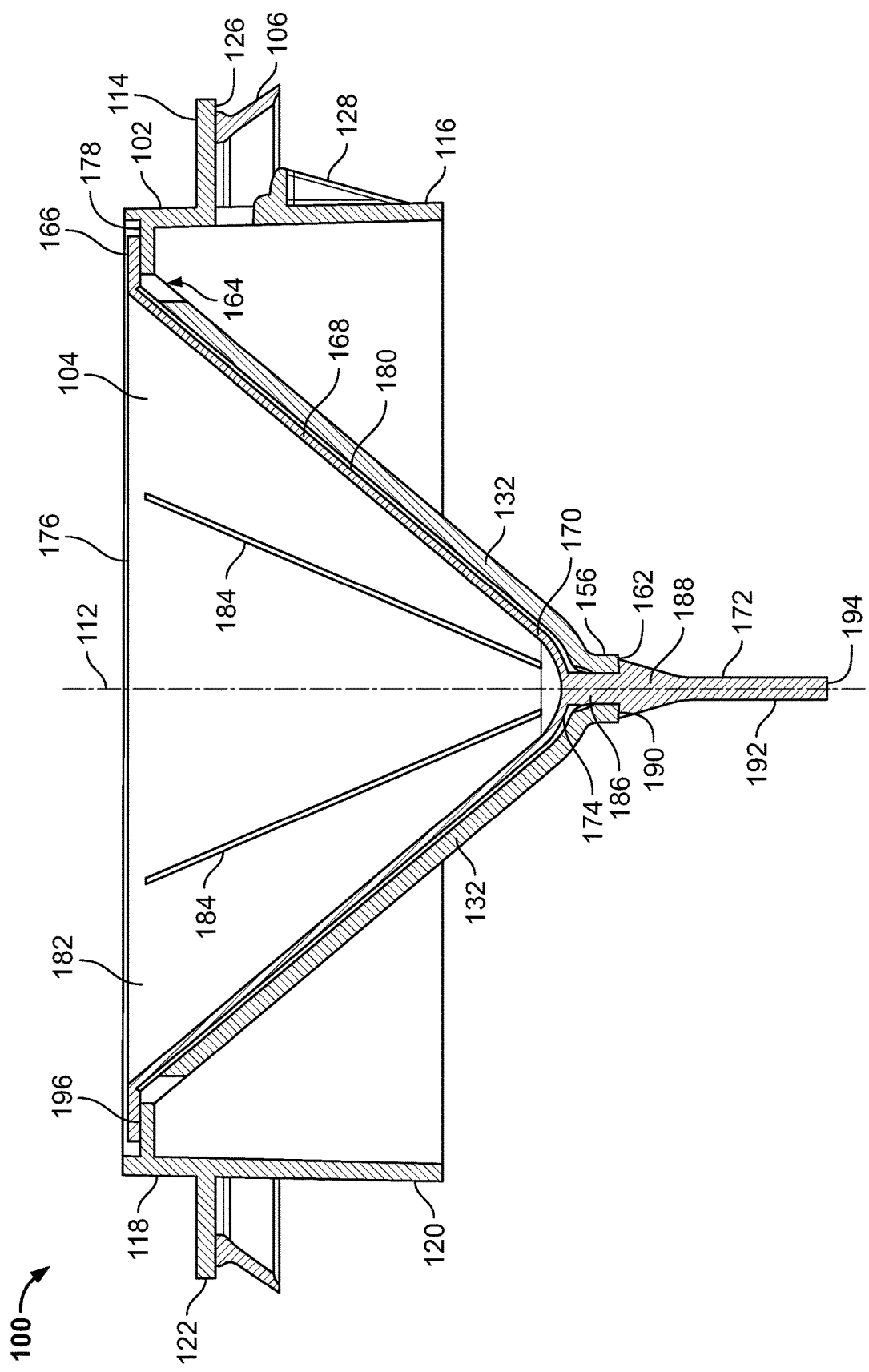
FIG. 4 is a cross-sectional view of the pressure relief valve taken along line 4-4 of FIG. 3.
Figure 5:
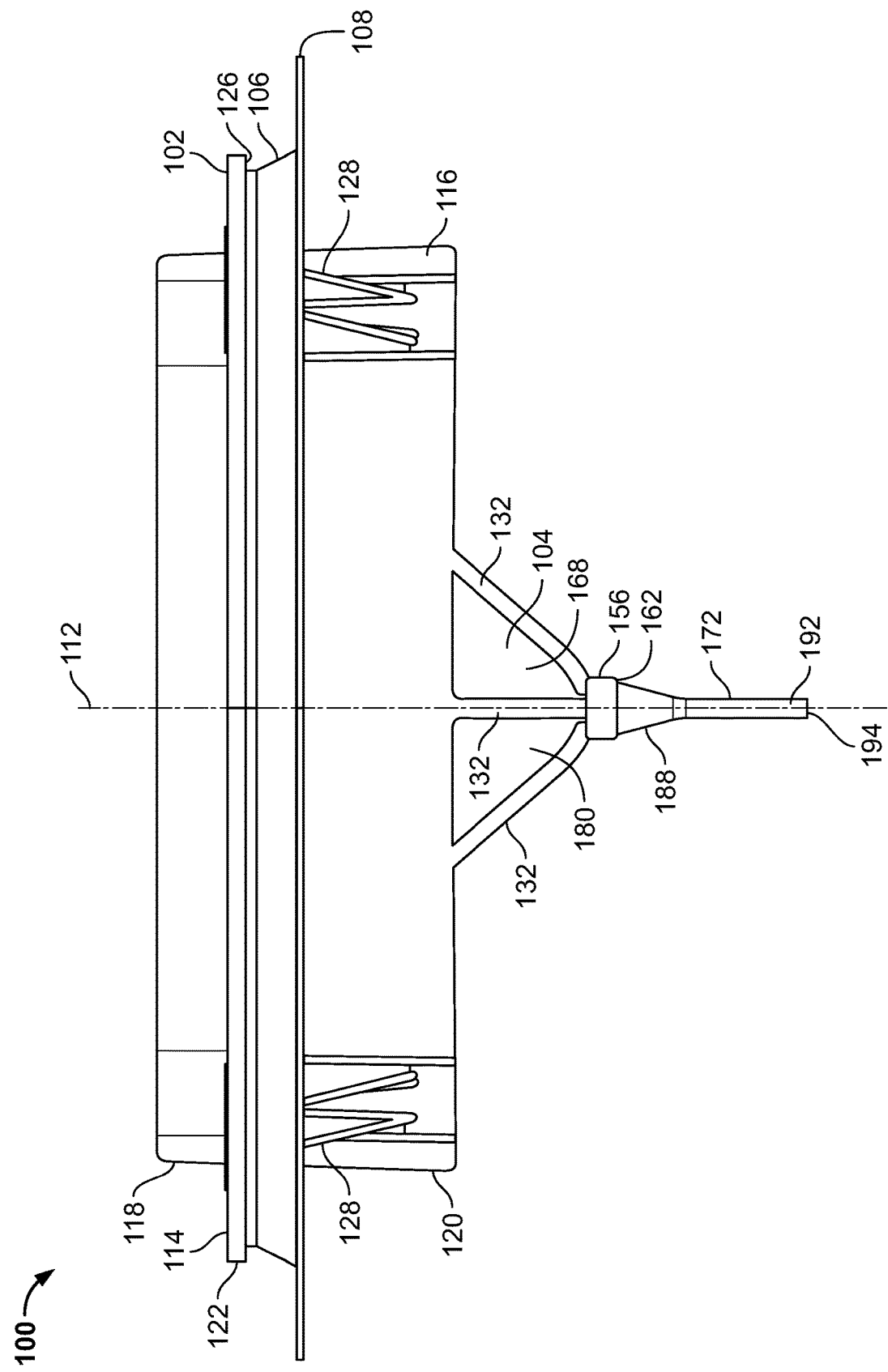
FIG. 5 is a side view of the pressure relief valve of FIG. 1 engaged with a panel.

FIGS. 1-10 illustrate a pressure relief valve assembly 100, according to a first aspect of the present disclosure, that includes a housing 102, a flap 104, and a seal 106. With particular reference to FIGS. 1-4, which depicts the pressure relief valve assembly 100 in an assembled configuration, the housing 102 at least partially receives the flap 104 and the seal 106 is coupled to the housing 102. Further, as will be further discussed herein, the flap 104 is at least partially disposed within a volume defined by the housing 102 and cooperates with the housing 102 to prevent the flow of air through the housing 102 when an environment associated with the pressure relief valve assembly 100, such as a cabin of a vehicle, is at a target, design, or desired air pressure. Still further, the flap 104 also allows the flow of air through the housing 102 (and out of the environment associated with the pressure relief valve assembly 100) when the pressure exceeds a target or threshold value. The seal 106 in various embodiments is configured to provide an airtight seal between the pressure relief valve assembly 100 and a structure, e.g., a vehicle panel, to which the pressure relief valve assembly 100 is mounted. For example, as shown in FIG. 5, the pressure relief valve assembly 100 engages and is mounted into or onto a panel 108, which may be constructed from a sheet of metal, and the seal 106 may provide an airtight seal between the pressure relief valve assembly 100 and the panel 108.

Figure 2:
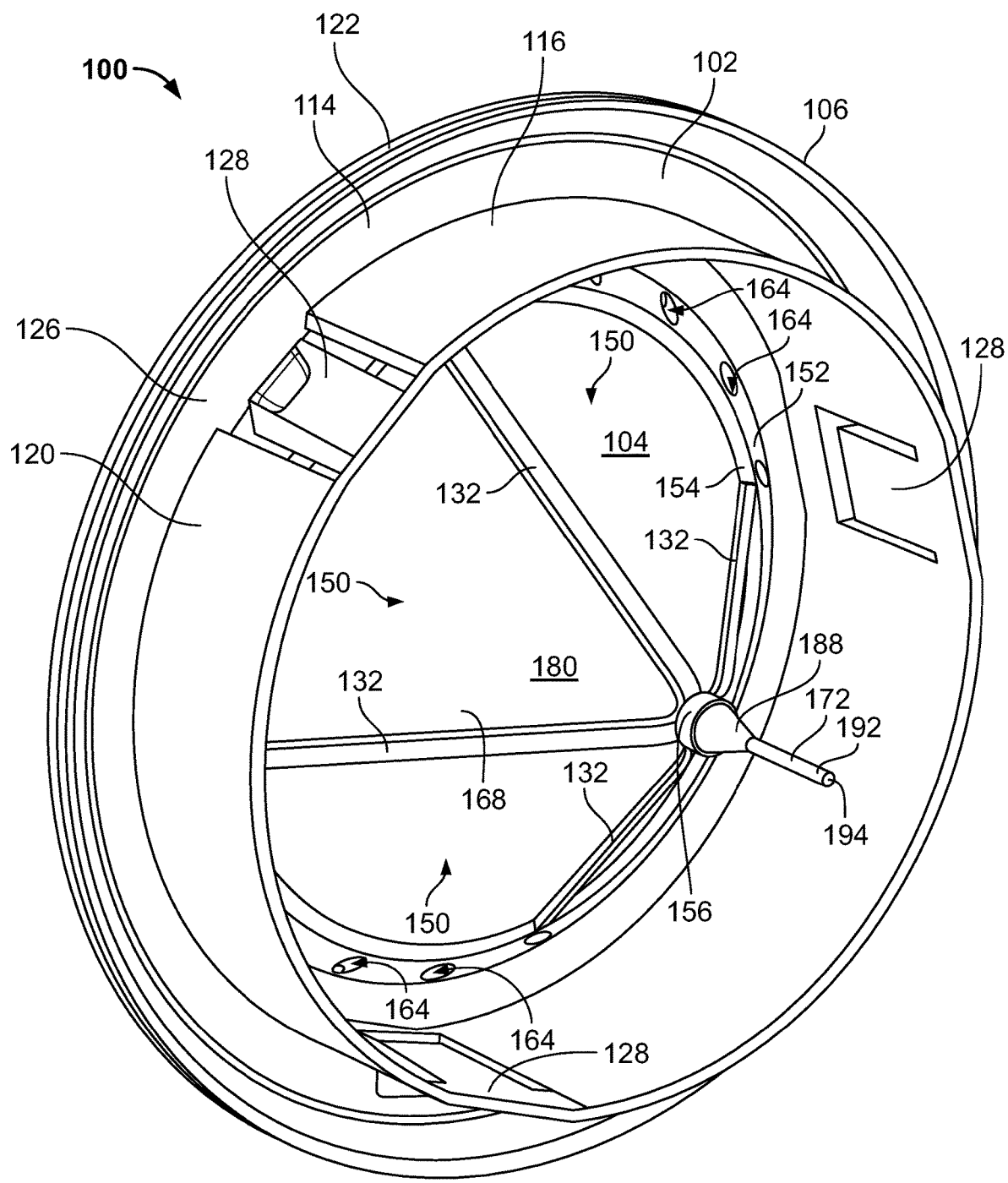
FIG. 2 is a bottom perspective view of the pressure relief valve of FIG. 1.

With particular reference to FIGS. 3 and 4, which is a top plan view of the pressure relief valve assembly 100 and a cross-sectional view of the pressure relief valve assembly 100 of FIG. 3 taken along line 4-4 (or axis 4-4) thereof, respectively, the pressure relief valve assembly 100, as well as the housing 102 and the flap 104 thereof, may have a generally symmetrical shape. In particular, the pressure relief valve assembly 100, including the housing 102 and the flap 104, may have a horizontal cross-section that is generally symmetrical across the axis 4-4 and generally symmetrical across a second axis 110, which is perpendicular to the axis 4-4 (see FIG. 3). Put differently, the pressure relief valve assembly 100, the housing 102, and the flap 104 may have a vertical line of symmetry across axis 4-4 and a horizontal line of symmetry across the axis 110. In particular embodiments, the pressure relief valve assembly 100, the housing 102, and the flap 104 may have a shape with a horizontal cross-section having infinite lines of symmetry. For example, in the particular embodiment shown in FIGS. 1-10 (as well as the embodiment shown in FIGS. 11-21), the pressure relief valve assembly 100, the housing 102, and the flap 104 may have a generally circular horizontal cross-section, which has infinite lines of symmetry. In other embodiments, the pressure relief valve assembly 100, the housing 102, and the flap 104, may each individually have a horizontal cross-section or profile that is oval-shaped, or oval-shaped with pointed ends (e.g., football shaped).

In further embodiments, as shown in FIGS. 4 and 5, the pressure relief valve assembly 100, the housing 102, and the flap 104 may have a vertical cross-section that is generally symmetrical across an axis 112, or may have a vertical line of symmetry across the axis 112. As will be further discussed herein, the symmetry of the pressure relief valve assembly 100 (as well as further aspects associated therewith), provide a pressure relief valve assembly 100 that functions independently from its particular orientation and independent from gravity. As such, the pressure relief valve assembly 100 is non-specific to its placement when attached to a particular component, such as an interior panel of a vehicle, for example.

Now referring to FIGS. 1-6, the housing 102 may include a base 114 that in turn includes a ring 116 having an upper peripheral extension 118 and a lower peripheral extension 120, and a flange 122 provided between the upper peripheral extension 118 and the lower peripheral extension 120. In other words, the ring 116 may be configured as an annular member that extends generally perpendicularly from the flange 122, both above (i.e., the upper peripheral extension 118) and below (i.e., the lower peripheral extension 120) the flange 122. In other embodiments, as will be further discussed herein, the base 114 may only include the upper peripheral extension 118 and/or may only include the lower peripheral extension 120. As shown in the illustrative embodiment, the flange 122 and/or the ring 116 may be generally circular in shape and may include an opening 124 therethrough (see FIG. 6), which may be generally defined by the upper and lower peripheral extensions 118, 120 of the ring 116. In particular embodiments, the opening 124 may be circular and may be located proximate the center of the base 114.

The flange 122 may also be configured to retain the seal 106, with the seal 106 acting to seal out water or air around the housing 102 when the housing 102 is mounted in place, such as within a component of a vehicle. For example, as previously noted herein, FIG. 5 depicts a panel 108, which may be constructed from a sheet metal, into which the pressure relief valve assembly 100 may be mounted. In particular embodiments, a lower surface 126 of the flange 122 may be a planar, flat surface and the seal 106 may be positioned on and extend from the lower surface 126. Additionally, in some embodiments, the seal 106 may be molded onto or with the housing 102, either by way of a two shot molding process or overmolding, for example. In other embodiments, the seal 106 may be constructed as a separate component and subsequently attached to the flange 122 of the housing 102. For example, the seal 106 may be molded and then subsequently press fit onto the housing 102.

As previously discussed herein, the seal 106 in various embodiments is molded onto the housing 102, for example by a two shot assembly or as an overmold, or, alternatively, the seal 106 may be formed as a separate part that is molded and press fit onto the housing 102. The seal 106 may be made of, for example, a thermoplastic elastomer (TPE), such as a thermoplastic vulcanizate (TPV) material, with a hardness selected as appropriate for the requirements of a particular application.

Figure 6:
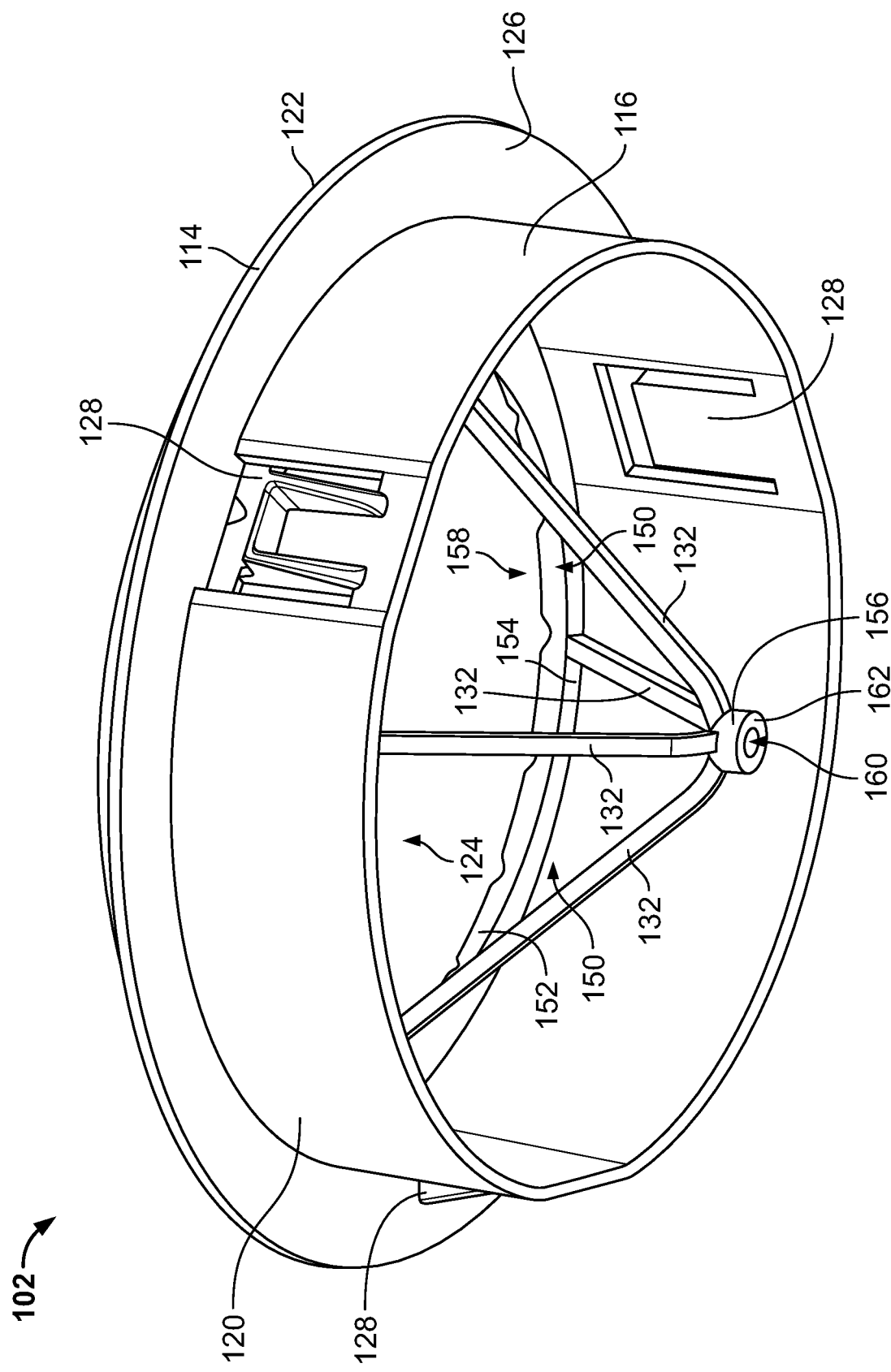
FIG. 6 is a bottom perspective view of the housing of the pressure relief valve of FIG. 1.
Figure 7:
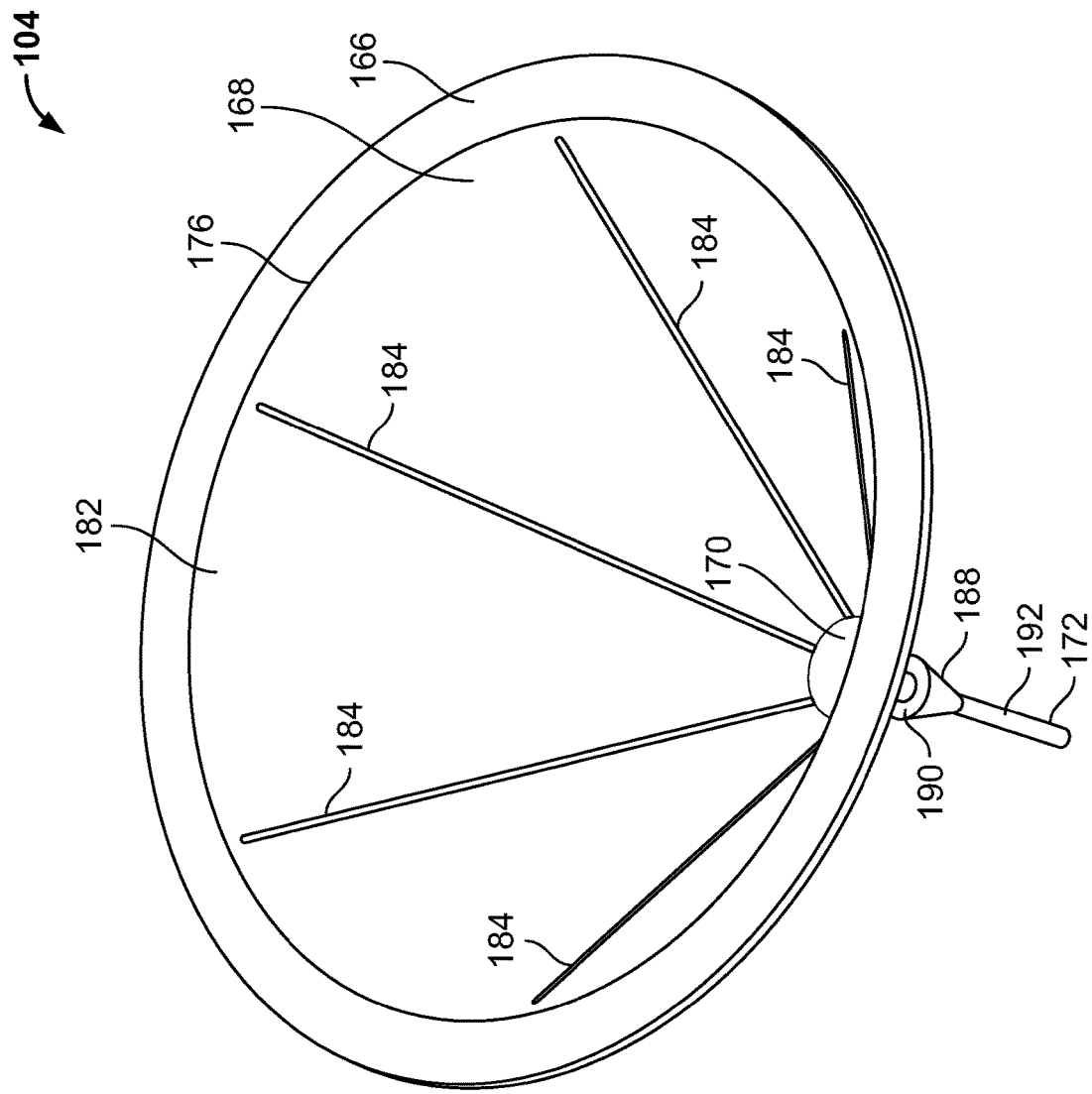
FIG. 7 is a top perspective view of the flap of the pressure relief valve of FIG. 1.
Figure 8:
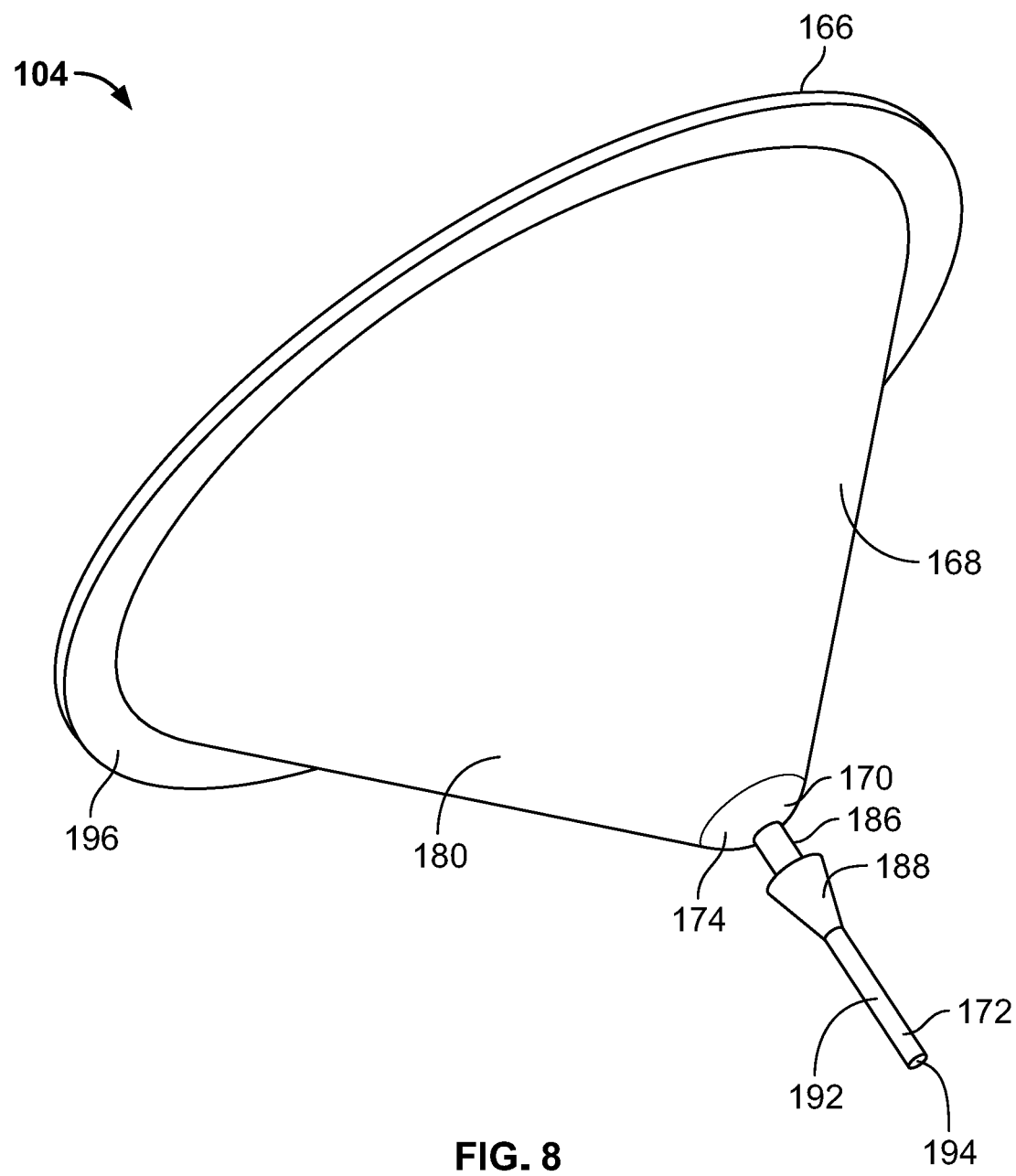
FIG. 8 is a bottom perspective view of the flap of FIG. 7.

The base 114 and, more particularly, the lower peripheral extension 120 of the ring 116 may also include one or more clips 128 disposed around an outer perimeter of the lower peripheral extension 120 of the ring 116. As best shown in FIG. 6, in this particular embodiment, the lower peripheral extension 120 of the ring 116 includes three clips 128. Although, in alternative embodiments, the base 114 may include any number of clips 128 and the particular number of clips 128 may vary and be dependent on the component to which the pressure relief valve assembly 100 is attached.

During use, the clips 128 are configured to hold the pressure relief valve assembly 100 in place (i.e., in a hole or opening formed in a component or panel, such as the panel 108 shown in FIG. 5). For example, the clips 128 may contact or engage an interior surface of the panel 108 and, as a result, the clips 128 may retain a component or panel between the clips 128 and the lower surface 126 of the flange 122. Further, once assembled with a component, the clips 128 of the pressure relief valve assembly 100 may help compress the seal 106 against the component to which the pressure relief valve is in cooperation with. For instance, in the particular embodiment shown in FIG. 5, the clips 128 compress at least a portion of the seal 106 against the panel 108 and, as a result, provide an airtight seal between the pressure relief valve assembly 100 and the panel 108.

With particular reference to FIGS. 2 and 4-6, the housing 102 may also include one or more receptacle members 132. In this particular embodiment, the housing 102 includes four receptacle members 132. The receptacle members 132 may also be spaced apart from each other and, as a result, may define a plurality of openings 150 therebetween. Additionally, as best shown in FIGS. 2 and 6, the receptacle members 132 may extend from an interior rim 152 (and, more particularly, an interior surface 154 of the interior rim 152 that defines the opening 124) to a central junction 156 that is centrally and concentrically disposed in an interior of the housing 102. More particularly, the receptacle members 132 extend away from the interior rim 152 of the flange 122, inward toward the central junction 156, and downward into an interior volume of the lower peripheral extension 120 of the ring 116. As such, the receptacle members 132 may define or bound a receiving space 158, into which the flap 104 may be positioned, as will be further discussed herein. In this particular embodiment, the receptacle members 132 have a tapered shape and, in the illustrated example, the tapered shape is a conical shape. In alternative embodiments, the receptacle members 132 may have other tapered shapes, such as a pyramid shape, a bowl shape, or a funnel shape. Further, as will be further discussed herein, the central junction 156 includes a junction opening 160 (see FIG. 6), defined by a distal surface 162 of the central junction 156, that is used to secure the flap 104 to the housing 102 in the illustrative embodiment.

Referencing FIGS. 2 and 4, the housing 102 may also include one or more apertures 164, which extend through the interior rim 152. In particular embodiments, the apertures 164 circumscribe a circumference of the interior rim 152 and are evenly spaced around the interior rim 152. As will be further discussed herein, in some aspects, the apertures 164 may not be evenly spaced around the interior rim 152, but rather, the apertures 164 may be strategically located along the interior rim 152. As an example, a first set of one or more apertures 164 may be extend through the interior rim 152 across a 90 degree rotation along the interior 152 (i.e., approximately ¼th of the interior rim 152), a second set of one or more apertures 164 may extend through the interior rim 152 across a 90 degree rotation along the interior rim 152 that is opposite from the first set of one or more apertures 164, and two blank portions of the interior rim 152

(i.e., portions without the apertures 164) may extend between the first set of one or more apertures 164 and the second set of one or more apertures 164.

In certain aspects, the apertures 164 may be provided to assist with opening the pressure relief valve assembly 100. More particularly, the apertures 164 may provide increased air-flow or pressure to an upper flange 166 of the flap 104, or to an area proximate thereto, and thereby accelerate the transition between a closed state and an open state of the pressure relief valve assembly 100. As such, the particular location, size, shape, and/or number of the apertures 164 may vary and may be dependent upon the particular function of the pressure relief valve assembly 100. For example, the particular location, size, shape and/or number of apertures 164 may be tuned based on the particular use and/or particular location of the pressure relief valve assembly 100. In addition, in the embodiment the apertures 164 are not evenly spaced around the rim 152, the apertures 164 may be strategically located along the interior rim to assist with the particular use of the pressure relief valve assembly 100.

In some embodiments, the housing 102 may include between 1 and 60 apertures, or between 10 and 50 apertures, or between 20 and 40 apertures. The apertures 164 may be provided in a variety of shapes, including, but not limited to, circles, ovals, hexagons, slits, rectangles, squares, diamonds, tapered holes (e.g., tapered circular apertures, tapered oval apertures, or tapered square apertures), etc. Additionally, the apertures 164 may be provided in a variety of sizes. For example, in the instance the apertures 164 are circular apertures (such as that shown in FIG. 2), the apertures 164 may have a diameter between about 0.1 mm to about 5 mm, or between about 1 mm to about 3 mm, or may have a diameter that varies between about 0.1 mm to about 1 mm (e.g., in the instance the apertures 164 taper).

In various embodiments, the housing 102 may be constructed or molded as a separate piece from the flap 104 and the seal 106. For example, the housing 102 may be made or molded out of polypropylene (PP), acrylonitrile butadiene styrene (ABS), polyamide (PA), polyethylene (PE), polyethylene terephthalate (PET), polymethyl methacrylate (PMMA), polyoxymethylene (POM), polystyrene (PS), polyvinyl chloride (PVC), and/or combinations thereof.

Figure 9:
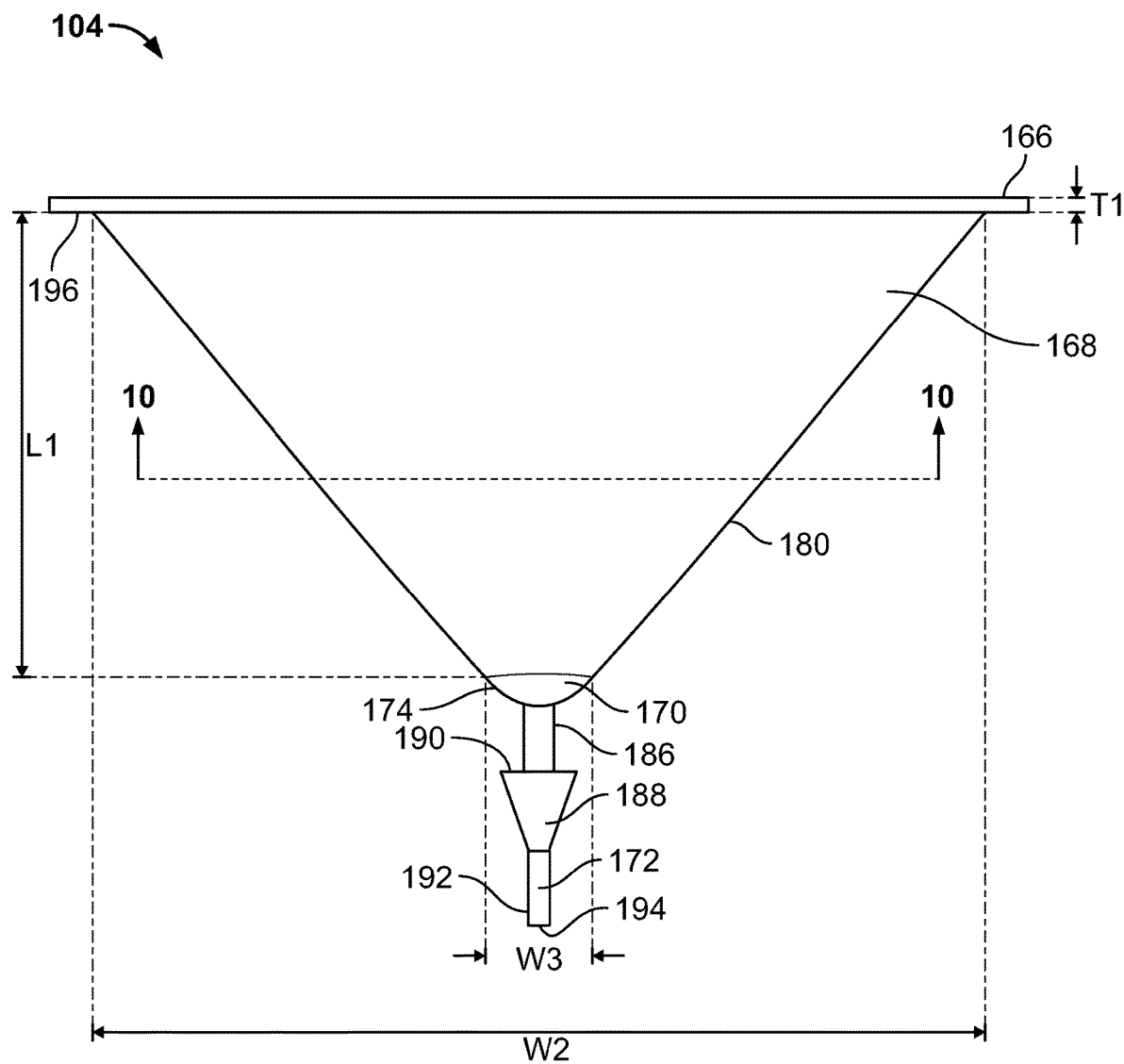
FIG. 9 is a side elevational view of the flap of FIG. 7.
Figure 10:
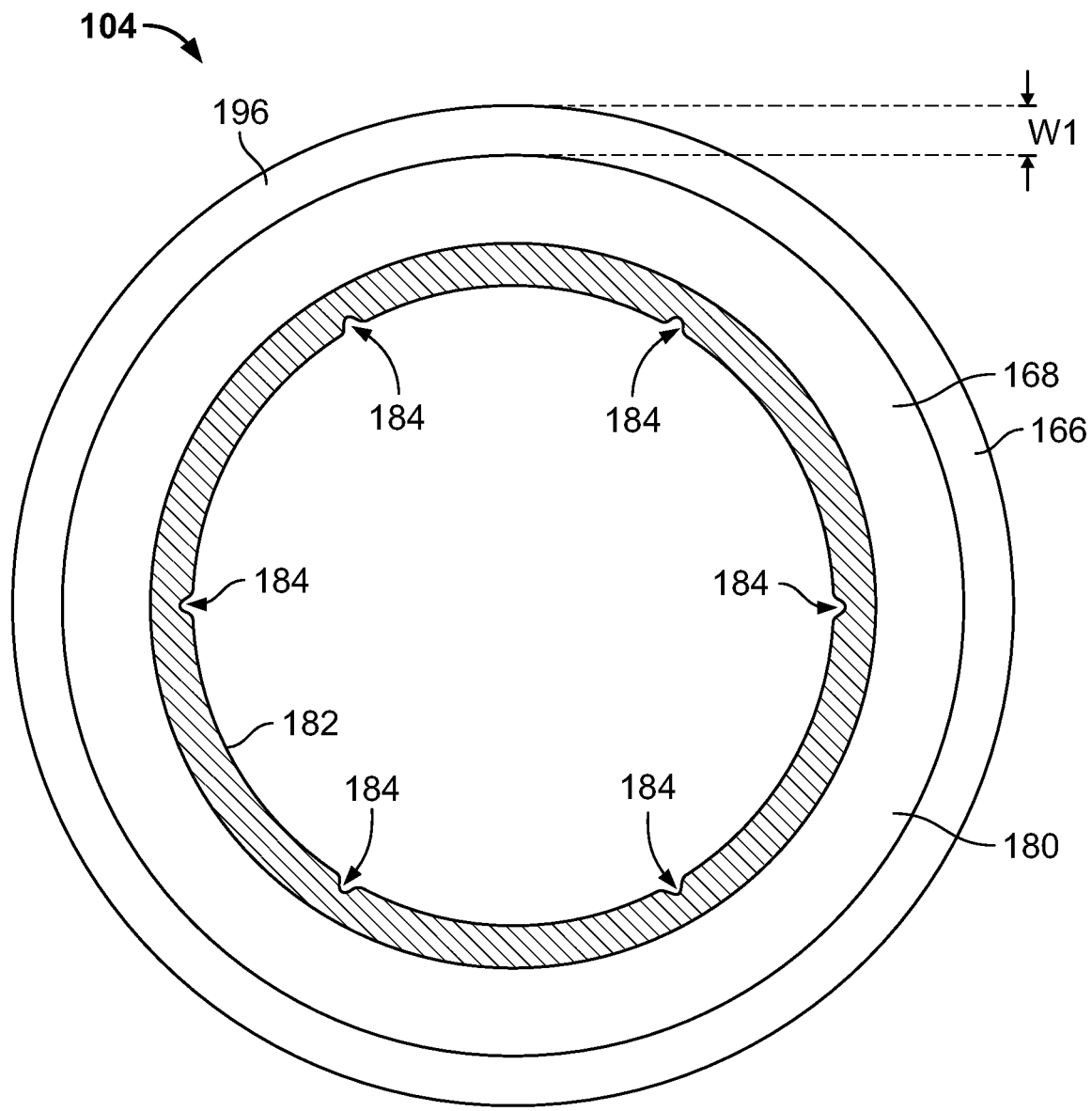
FIG. 10 is a cross-sectional view of the flap of FIG. 9, taken along line 10-10 thereof.

FIGS. 7-10 depict the flap 104, which is configured to be accepted by the housing 102 and contact the receptacle members 132 when the flap 104 is in a closed position. For example, FIGS. 1-5 depict the flap 104 in a closed position. In the illustrated embodiment shown in FIGS. 7-10, the flap 104 includes an upper flange 166, a tapered portion 168 that extends downwardly from the upper flange 166 toward a lower bowl 170, and a stem 172 that extends from an exterior surface 174 of the lower bowl 170 (see FIG. 8). The upper flange 166 is a peripheral extension that extends outwardly from an upper edge 176 of the tapered portion 168 and, as best shown in FIGS. 9 and 10, may have a thickness T1 (see FIG. 9) and a width W1 (see FIG. 10). Further, the flange 122, in the illustrated example, is ring shaped and is configured to rest on or abut a top surface 178 of the upper peripheral extension 118 of the housing 102 when the flap 104 is disposed within the housing 102 (see FIG. 4).

The tapered portion 168 has a maximum width W2 (see FIG. 9) when proximate to the upper flange 166, tapers inwardly toward the lower bowl 170 or stem 172, and has a minimum width W3 (see FIG. 9) when proximate to the lower bowl 170 or stem 172. In the particular embodiment shown herein, the tapered portion 168 is configured as a cone having a length L1 (see FIG. 9) which defines the length between the maximum width W2 and the minimum width W3. Further, the tapered portion 168 is configured as a cone having the length L1 and a rate of taper or slope configured to allow the tapered portion 168 to sit in the interior volume defined by the receptacle members 132 with an exterior surface 180 of the tapered portion 168 resting against the receptacle members 132 when the flap 104 is in a closed position to prevent passage of air through the openings 150. Although the flap 104 has a tapered conical configuration in the present embodiment, it should be appreciated that the flap 104 may have alternative configurations. In other embodiments, the flap 104 and, more particularly, the tapered portion 168 of the flap 104, may have a shape that mimics the interior volume or receiving space 158 of the housing 102, which is defined by the receptacle members 132. As such, in some aspects, the tapered portion 168 has a shape that corresponds to the shape of the receptacle members 132, or the receptacle members 132 may define the tapered portion 168 of the flap 104. For example, in the embodiment where the receptacle members 132 have a tapered pyramid shape, the tapered portion 168 of the flap 104 may similarly include a tapered pyramid shape.

With particular reference to FIGS. 1, 3, 4, 7, and 10, an interior surface 182 of the tapered portion 168 may include one or more troughs 184. Further, the troughs 184 may be distributed around and may extend along the interior surface 182 of the tapered portion 168. As best shown in FIG. 10, in this particular embodiment, the troughs 184 are recessed into the interior surface 182 of the tapered portion 168 and, resultantly, are recessed surfaces or valleys within the interior surface 182. The troughs 184 may be proximate to and may extend from the upper edge 176 of tapered portion 168, and may extend to and be proximate to the lower bowl 170 of the flap 104. During use, as will be further discussed herein, the troughs 184 are configured to help improve folding and/or bending of the flap 104 at a desired pressure. In this particular embodiment, the flap 104 includes six troughs 184 evenly spaced around the interior surface 182. However, in alternative embodiments, the flap 104 may include any number of troughs 184 and, in particular, the number of troughs 184 may be dependent on the particular use of the pressure relief valve assembly 100 and/or the particular shape or shape of the flap 104. For example, a greater number of troughs 184 may be desired if the surface area of the internal surface 182 of the tapered portion 168 is increased.

As shown in FIGS. 7-10 and discussed herein, the flap 104 also includes a stem 172. The stem 172 may extend outwardly from the exterior surface 174 of the lower bowl 170 of the tapered portion 168 or, put differently, the stem 172 may be disposed along the central axis 112 (see FIG. 4) at the narrowest portion of the flap 104. Further, the stem 172 includes a base extension 186, a tapered intermediate section 188 with an upper edge 190, and a distal extension 192 that terminates at a distal end 194. During use, the distal end 194 of the flap 104 may be aligned with and urged through the junction opening 160 until the upper edge 190 of the intermediate section 188 passes through the junction opening 160. Once the upper edge 190 of the intermediate section 188 passes through the junction opening 160, the upper edge 190 may engage, be flush with, or come into contact with the distal surface 162 of the central junction 156 (see FIG. 4). As such, the flap 104 is secured to, or in engagement with, the housing 102. At this point, the tapered portion 168 is seated within the interior volume or receiving space 158 defined by the receptacle members 132, the exterior surface 180 of the tapered portion 168 rests against the receptacle members 132, and a bottom surface 196 of the upper flange 166 rests on or abuts against the top surface of the upper peripheral extension of the housing 102 (see FIG. 4).

In various embodiments, the flap 104 is molded as a separate piece and assembled via press fit or snap fit onto the housing 102 (e.g., via stem 172). The flap 104 may be made of, for example, a thermoplastic elastomer material, such as a thermoplastic vulcanizate (TPV), with a hardness selected as appropriate for the requirements of a particular application. Generally, the flap 104 may be used to keep water and air from entering a cabin of a vehicle, but upon a door slam (or other event raising the pressure within the cabin a given amount) the flap 104 acts to allow air to exit the vehicle interior.

As will be discussed herein, once assembled with the housing 102, the flap 104 is resiliently biasable to an open position (e.g., where at least a portion of the flap 104 biases or bends inwardly away from the receptacle members 132 and/or the flange 122 of the housing 102 via openings 150, apertures 164, and/or troughs 184) to allow passage of air through the pressure relief valve assembly 100 (e.g., through the openings 150 and the flange opening 124). Accordingly, the flap 104 inhibits airflow through the openings 150 in the closed position, and allows airflow through the openings 150 and/or the apertures 164 in the open position. The configuration of the flap 104 (e.g., size, shape, thickness, and material used) may be selected so that the tapered flap 104 is flexible enough to bias inwardly under a desired pressure at which the pressure relief valve assembly 100 is designed to allow passage of air, but resilient and rigid enough to return to the closed position when exposed to a lower air pressure (e.g., a desired cabin pressure).

Figure 11:
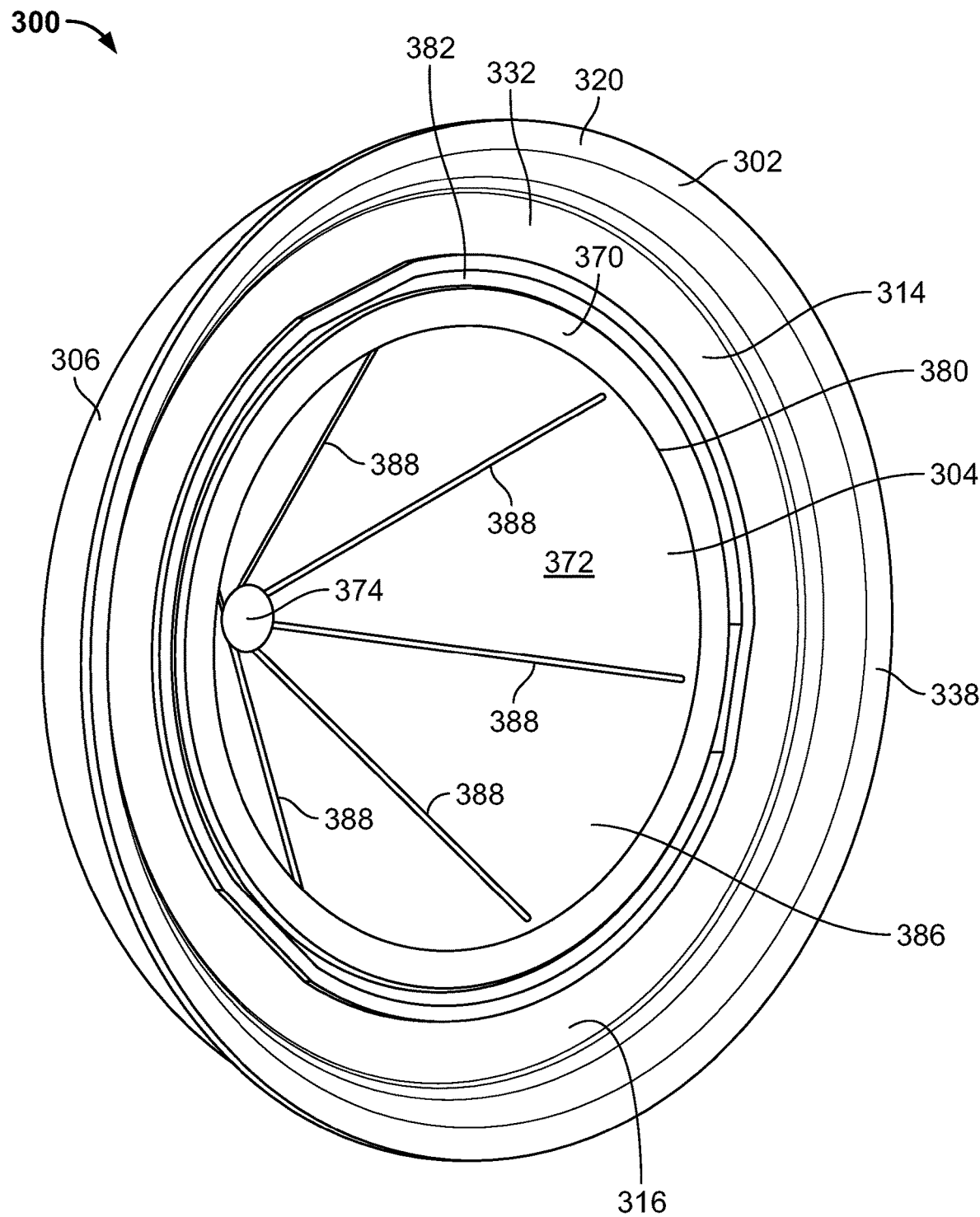
FIG. 11 is a top perspective view of a pressure relief valve having a housing, a flap, and a seal, according to a second embodiment of the present disclosure.
Figure 12:
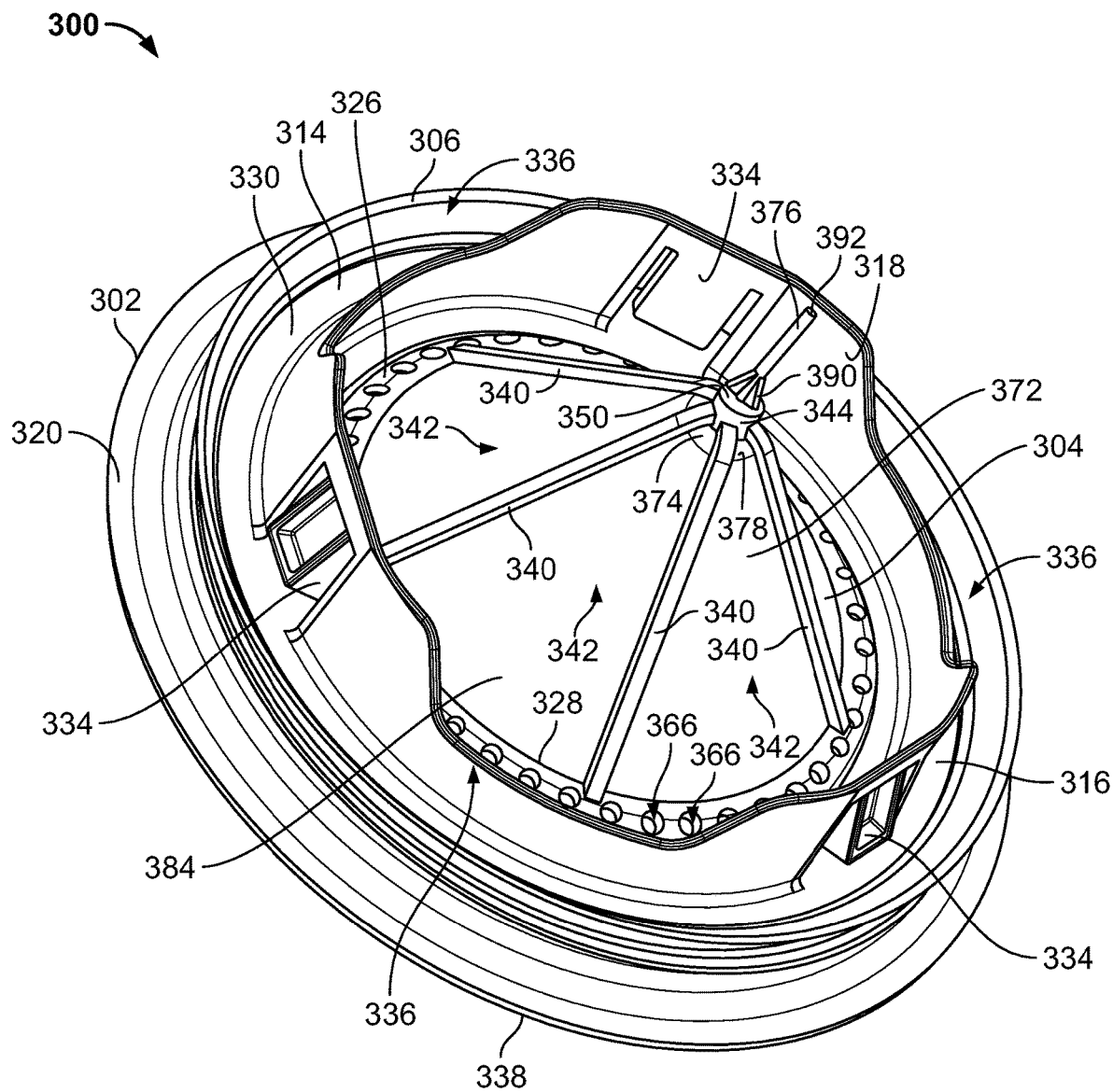
FIG. 12 is a bottom perspective view of the pressure relief valve of FIG. 11.
Figure 13:
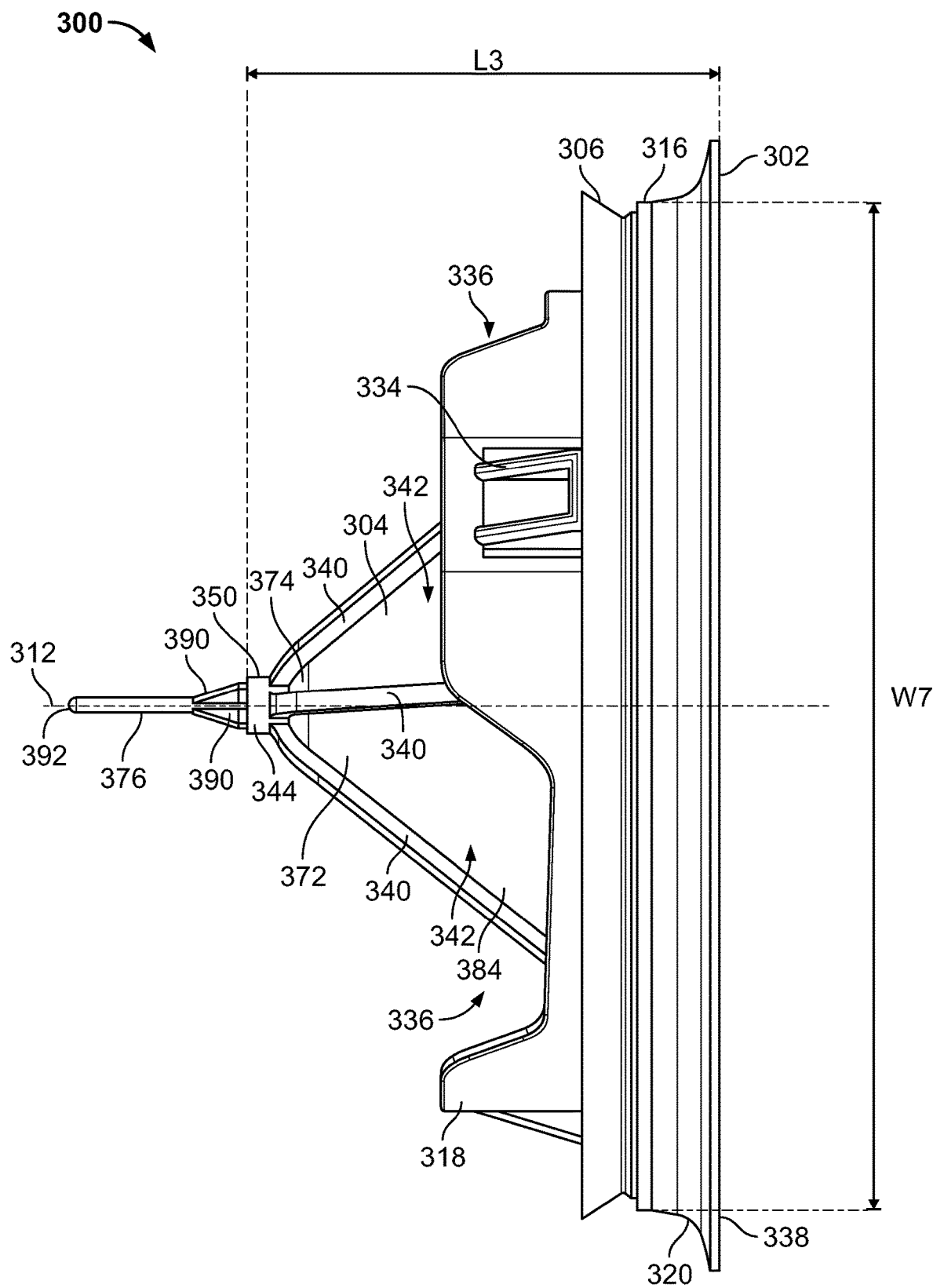
FIG. 13 is a side elevational view of the pressure relief valve of FIG. 11.

FIGS. 11-21 depict another pressure relief valve assembly 300, according to a second aspect of the present disclosure, that includes a housing 302, a flap 304, and a seal 306. With particular reference to FIGS. 11-13, which depicts the pressure relief valve assembly 300 in an assembled configuration, the housing 302 may at least partially receive the flap 304 and the seal 306 may be coupled to the housing 302. Further, similar to the pressure relief valve assembly 100, the flap 304 is at least partially disposed within an interior volume defined by the housing 302 and cooperates with the housing 302 to prevent the flow of air through the housing 302 when an environment associated with the pressure relief valve assembly 300, such as a cabin of a vehicle, is at or has reached a target, designed, or desired air pressure. Still further, the flap 304 also allows the flow of air through the housing 302 (and out of the environment associated with the pressure relief valve assembly 300) when the pressure exceeds a target or threshold value. The seal 306 in various embodiments is configured to provide an airtight seal between the pressure relief valve assembly 300 and a structure, e.g., a vehicle panel, to which the pressure relief valve assembly 300 is mounted.

As discussed previously herein, the pressure relief valve assembly 300, as well as the housing 302 and the flap 304 thereof, may have a generally symmetrical shape. In particular, the pressure relief valve assembly 300, including the housing 302 and the flap 304, may have a horizontal cross-section that is generally symmetrical across a first axis (not shown) and generally symmetrical across a second axis (not shown) that is perpendicular to the first axis. In other words, when viewed from a top plan view, similar to that shown in FIG. 3, the pressure relief valve assembly 300, the housing 302, and the flap 304 may have a vertical line of symmetry across a first axis and a horizontal line of symmetry across a second axis that is perpendicular to the first axis. For example, with reference to FIG. 18, the flap 304 may have a vertical line of symmetry across a first axis 308 and a horizontal line of symmetry across a second axis 310. And, in particular embodiments, the pressure relief valve assembly 300, the housing 302, and the flap 304 may have a shape with a horizontal cross-section having infinite lines of symmetry. For example, in the particular embodiment shown in FIGS. 11-21 (as discussed previously), the pressure relief valve assembly 300, the housing 302, and the flap 304 may have a generally circular horizontal cross-section that has infinite lines of symmetry. In other embodiments, the pressure relief valve assembly 300, the housing 302, and the flap 304, may each individually have a horizontal cross-section or profile that is oval-shaped, or oval-shaped with pointed ends (e.g., football shaped).

In further embodiments, as shown in FIG. 13, the pressure relief valve assembly 300, the housing 302, and the flap 304 may have a vertical cross-section that is generally symmetrical across an axis 312, or may have a vertical line of symmetry across the axis 312. As discussed herein and below, the symmetry of the pressure relief valve assembly 300 (as well as further aspects associated therewith), provide a pressure relief valve assembly 300 that functions independently from its particular orientation and independent from gravity. As such, the pressure relief valve assembly 300 is non-specific to its placement when attached to a particular component, such as an interior panel of a vehicle, for example.

Figure 14:
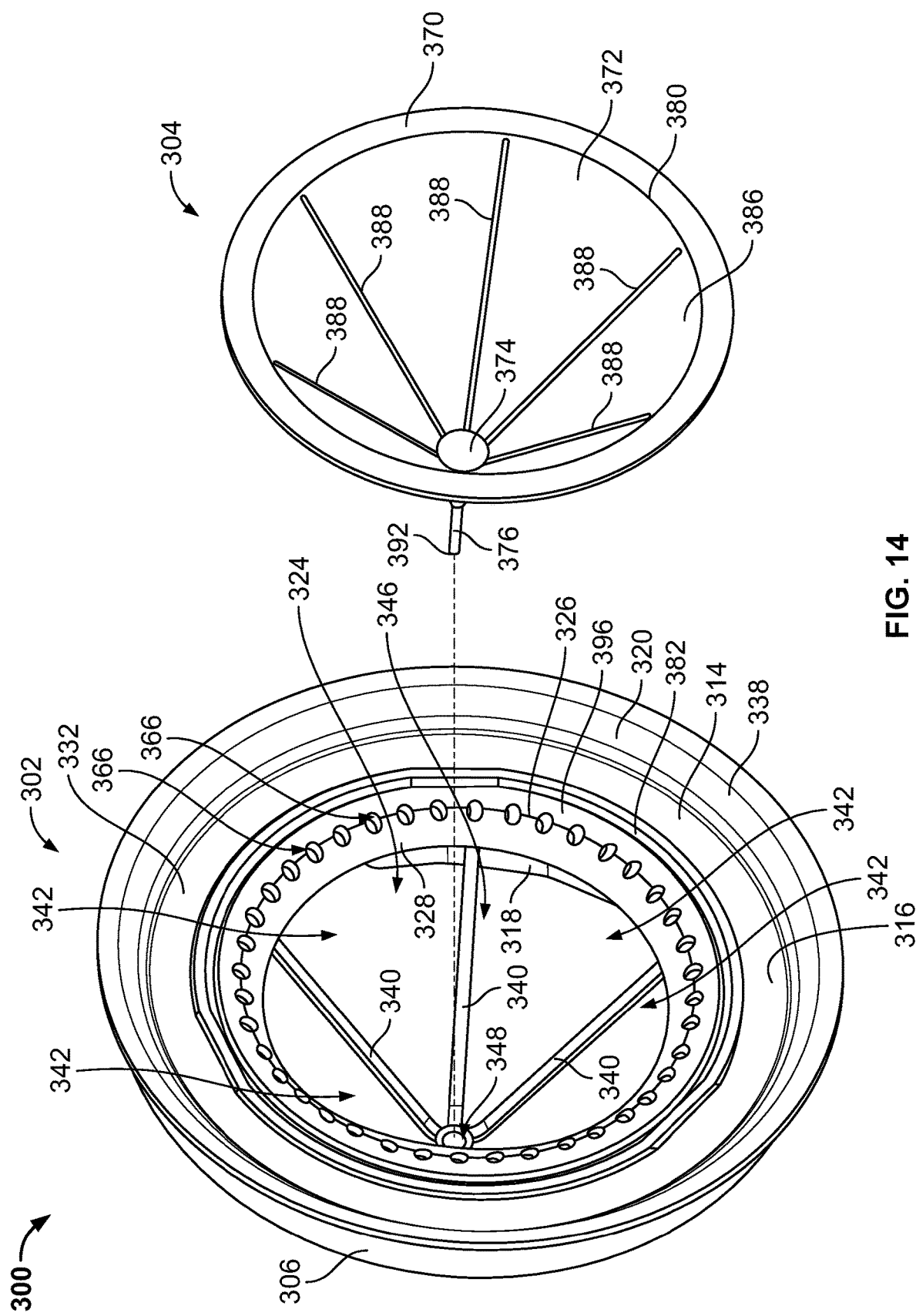
FIG. 14 is an exploded view of the pressure relief valve of FIG. 11.
Figure 15:
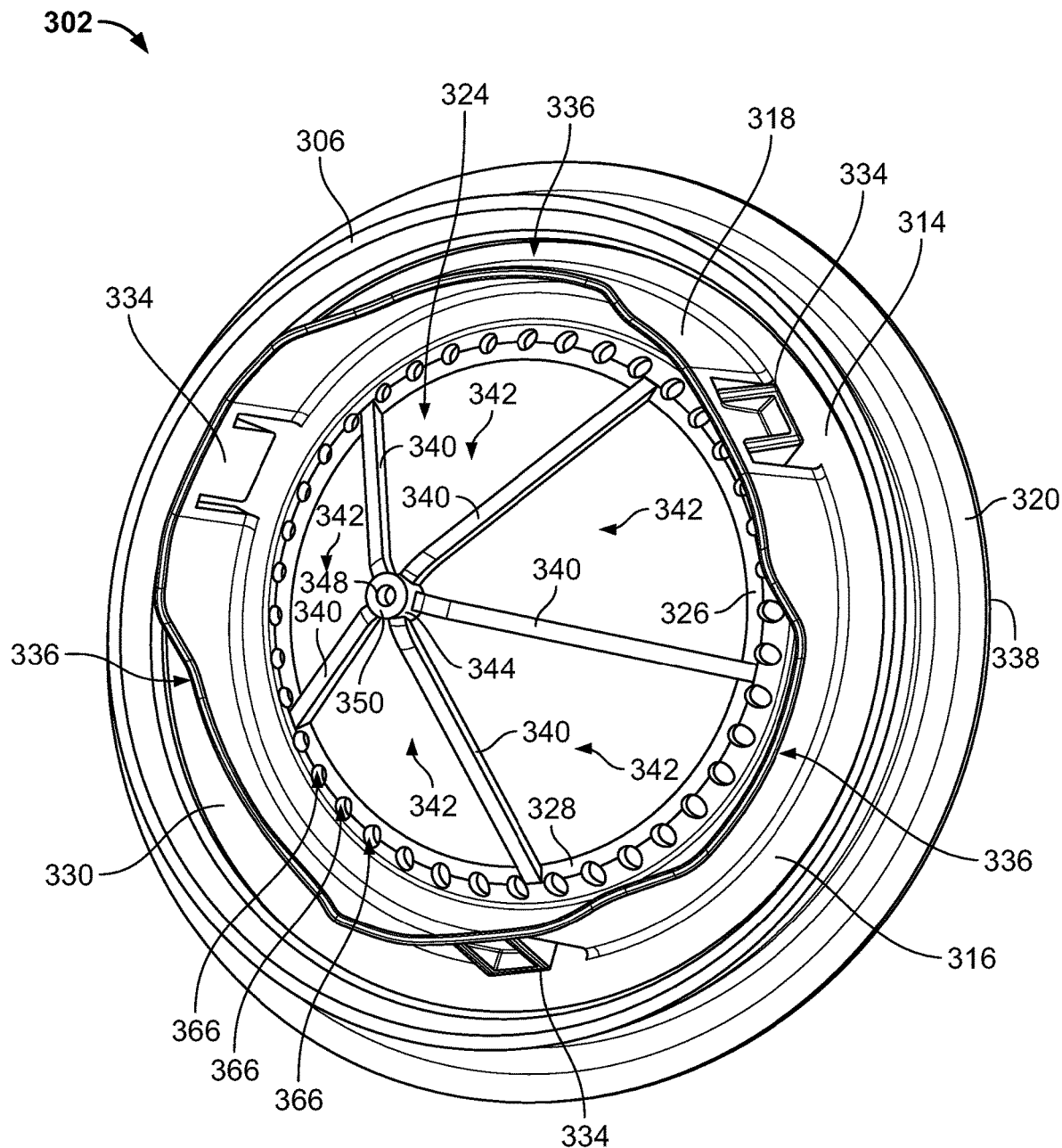
FIG. 15 is a bottom perspective view of the housing and the seal of the pressure relief valve of FIG. 11.
Figure 16:
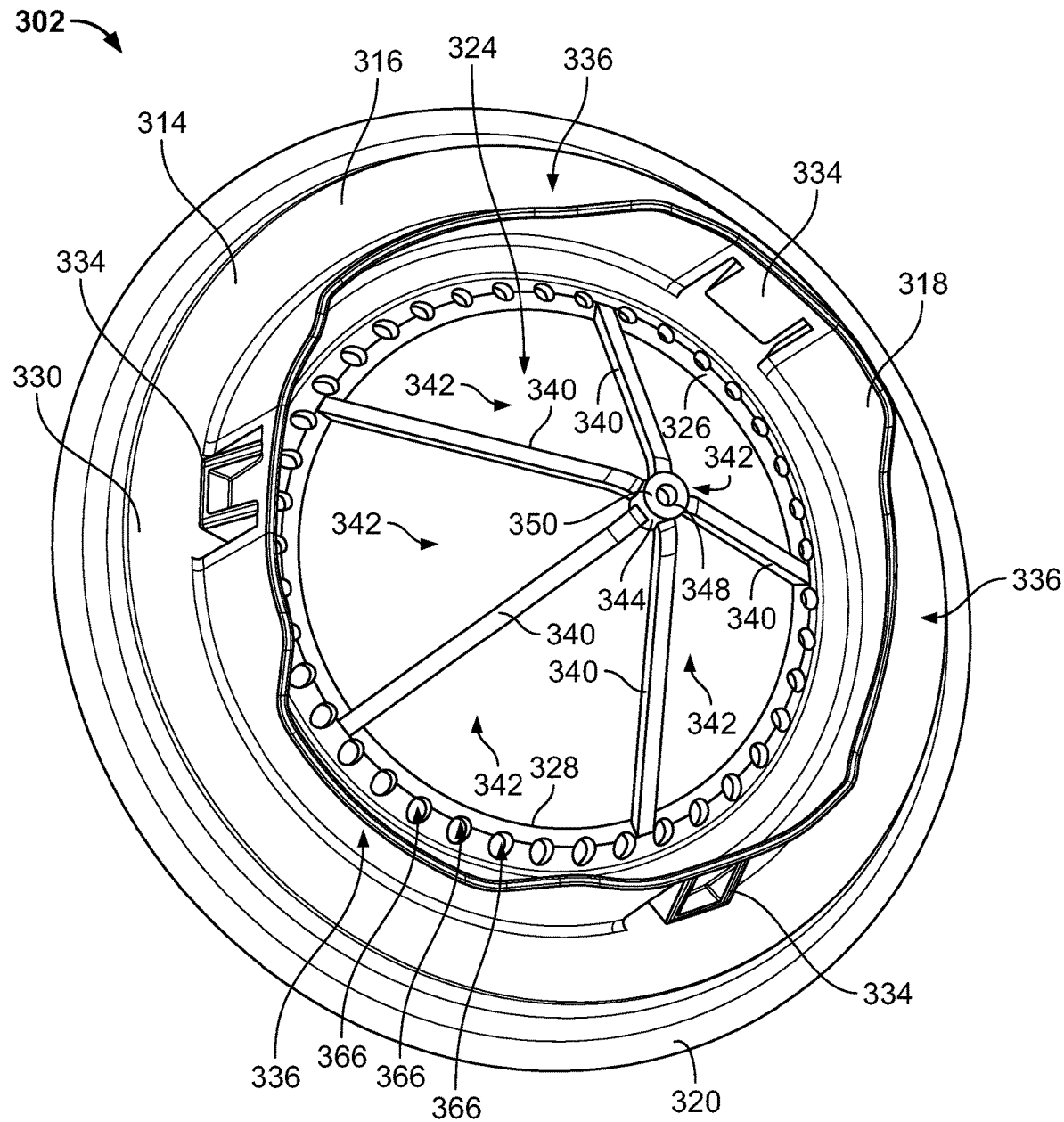
FIG. 16 is a bottom perspective view of the housing of the pressure relief valve of FIG. 11.
Figure 17:
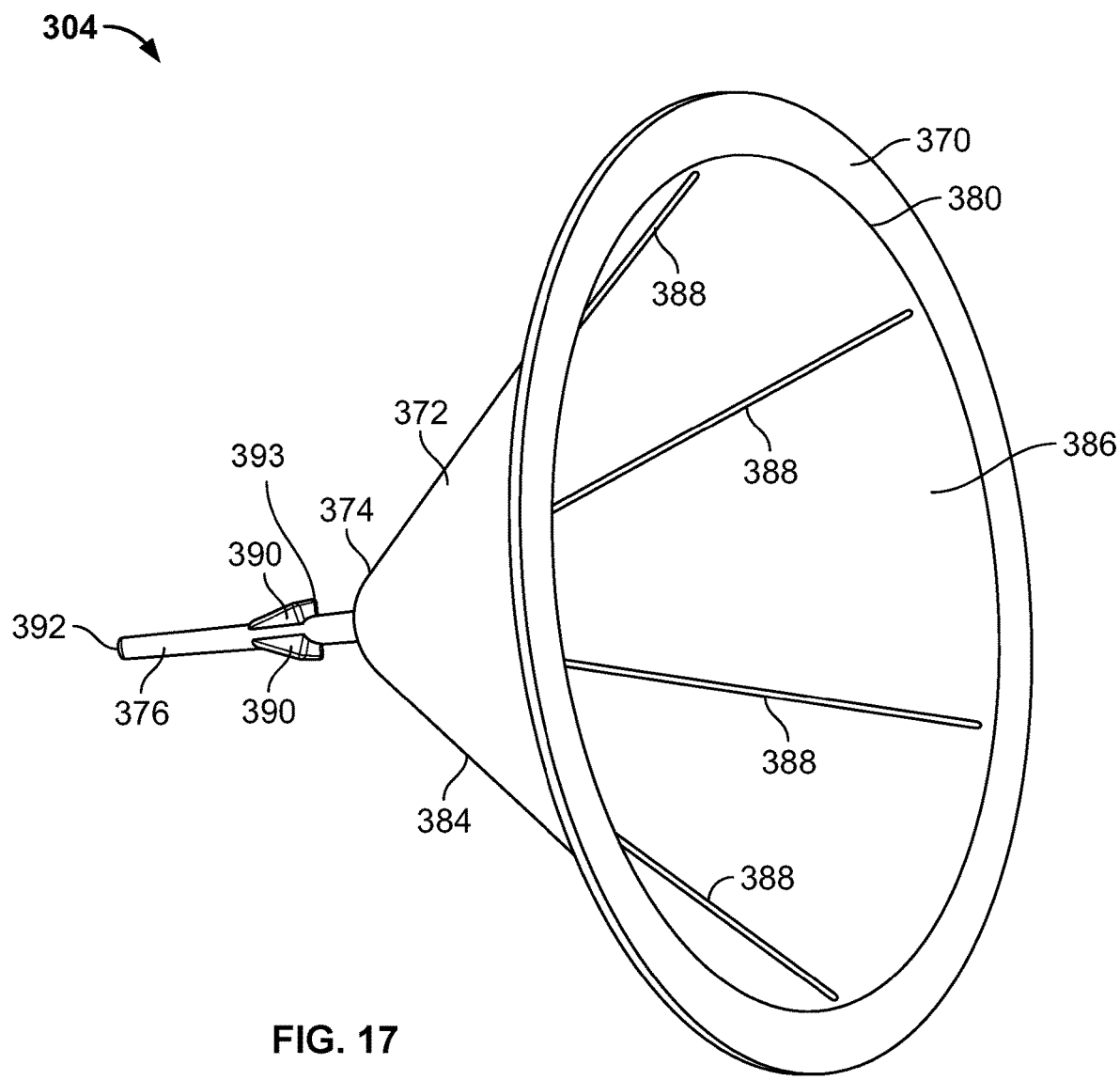
FIG. 17 is top perspective view of the flap of the pressure relief valve of FIG. 11.

Now referring to FIGS. 14-16, the housing 302 may include a base 314 with a flange 316, a lower peripheral extension 318 projecting downwardly from the flange 316, and an upper peripheral extension or rim 320 that projects upwardly and outwardly from the flange 316. As shown in the illustrative embodiment, the flange 316, the lower peripheral extension 318, and the upper peripheral rim 320 may be generally circular in shape and may include an opening 324 therethrough (see FIG. 14). In particular embodiments, the opening 324 may be circular, may be located proximate the center of the flange 316, and may be generally defined by a downwardly angled surface 326 of an interior rim 328 of the flange 316 (see FIG. 14). In other words, the flange 316 may be configured as an annular member with the lower peripheral extension 318 extending from a rear distal surface 330 of the flange 316 and the upper peripheral rim 320 extending from a front distal surface 332 of the flange 316.

The flange 316 may also be configured to retain the seal 306, with the seal 306 acting to seal out water or air around the housing 302 when the housing 302 is mounted in place, e.g., within a component of a vehicle, as previously discussed herein (for example, FIG. 5). In particular embodiments, the rear distal surface 330 of the flange 316 may be a planar, flat surface and the seal 306 may be positioned on or around the rear distal surface 330. As also discussed herein, in some embodiments, the seal 306 may be molded onto or with the housing 302, either by way of a two shot molding process or overmolding, for example, and, in other embodiments, the seal 306 may be constructed as a separate component and subsequently attached to the flange 316 of the housing 302. For example, the seal 306 may be molded then subsequently press fit onto the housing 302.

Similar to the seal 106 of the pressure relief valve assembly 100, the seal 306 may be made of, for example, a thermoplastic elastomer (TPE), such as a thermoplastic vulcanizate (TPV) material, with a hardness selected as appropriate for the requirements of a particular application.

The base 314 and, more particularly, the lower peripheral extension 318, may include one or more clips 334 disposed around an outer perimeter of the lower peripheral extension 318. As best shown in FIGS. 15 and 16, in this particular embodiment, the lower peripheral extension 318 includes three clips 334. Although, in alternative embodiments, the base 314 may include any number of clips 334 and the particular number of clips 334 may vary and be dependent on the component to which the pressure relief valve assembly 300 is attached. Further, as shown in FIGS. 12, 13, 15, and 16, the lower peripheral extension 318 may include one or more cut-out portions 336. In particular embodiments, the cut-out portions 336 extend between portions of the lower peripheral extension 318 that include the clips 334.

During use, the clips 334 are configured to hold the pressure relief valve assembly 300 in place, i.e., in a hole or opening formed in a component or panel, such as a panel within a vehicle. For example, the clips 334 may contact or engage an interior surface of a panel and resultantly retain a component or panel between the clips 334 and the rear distal surface 330 of the flange 316. Further, once assembled with a component, the clips 334 of the pressure relief valve assembly 300 may help compress the seal 306 against the component to which the pressure relief valve assembly 300 is in cooperation with.

Referencing to FIGS. 11, 13, and 14, the upper peripheral extension or rim 320 projects upwardly and outwardly from the flange 316 to an upper brim 338, and may have a semi-parabolic cross-section. In this particular embodiment, the upper peripheral rim 320 is proximate to an exterior edge of the flange 316. The upper peripheral rim 320 may also function as a water trough, once assembled with a component, and thereby prevent undesirable substances (e.g., water) from passing through or into the pressure relief valve assembly 300.

With reference to FIGS. 15 and 16, the housing 302 may also include one or more receptacle members 340. In this particular embodiment, the housing 302 includes five receptacle members 340. The receptacle members 340 may also be spaced apart from each other and, as a result, may define a plurality of openings 342 therebetween. Additionally, as best shown in FIGS. 12, 15, and 16, the receptacle members 340 may extend from the interior rim 328 (and, more particularly, an interior surface of the interior rim 328 that defines the opening 324) to a central junction 344 that is centrally and concentrically disposed in an interior of the housing 302. More particularly, the receptacle members 340 extend away from an interior rim 328 of the flange 316, inward toward the central junction 344, and downward into an interior volume of the lower peripheral extension 318. As such, the receptacle members 340 may define or bound a receiving space 346 (see FIG. 14), into which the flap 304 may be positioned. In this particular embodiment, the receptacle members 340 have a tapered shape and, in the illustrated example, the tapered shape is a conical shape. In alternative embodiments, as discussed herein, the receptacle members 340 may have other tapered shapes, such as a pyramid shape, a bowl shape, or a funnel shape. Further, as will be further discussed herein, the central junction 344 includes a junction opening 348, defined by a distal surface 350 of the central junction 344 that is used to secure the flap 304 to the housing 302 in the illustrative embodiment.

Still referencing FIGS. 15 and 16, the housing 302 may also include one or more apertures 366, which extend through the interior rim 328. In particular embodiments, the apertures 366 circumscribe a circumference of the interior rim 328 and are evenly spaced around the interior rim 328. As will be further discussed herein, in some aspects, the apertures 366 may not be evenly spaced around the interior rim 328, but rather, the apertures 366 may be strategically located along the interior rim 328. As an example, a first set of one or more apertures 366 may be extend through the interior rim 328 across a 90 degree rotation along the interior 328 (i.e., approximately ¼th of the interior rim 328), a second set of one or more apertures 366 may extend through the interior rim 328 across a 90 degree rotation along the interior rim 328 that is opposite from the first set of one or more apertures 366, and two blank portions of the interior rim 328 (i.e., portions without the apertures 366) may extend between the first set of one or more apertures 366 and the second set of one or more apertures 366.

In certain aspects, the apertures 366 may be provided to assist with opening the pressure relief valve assembly 300. More particularly, the apertures 366 may provide increased air-flow or pressure to an upper flange 370 of the flap 304, or to an area proximate thereto, and thereby accelerate the transition between a closed state and an open state of the pressure relief valve assembly. As such, the particular location, size, shape, and/or number of the apertures 366 may vary and may be dependent upon the particular function of the pressure relief valve assembly 300. For example, as previously discussed herein, the particular location, size, shape and/or number of apertures 366 may be tuned based on the particular use and/or particular location of the pressure relief valve assembly 300. In addition, in the embodiment the apertures 366 are not evenly spaced around the rim 328, the apertures 366 may be strategically located along the interior rim to assist with the particular use of the pressure relief valve assembly 300.

In some embodiments, the housing 302 may include between 1 and 60 apertures, or between 10 and 50 apertures, or between 20 and 40 apertures. The apertures 366 may be provided in a variety of shapes, including, but not limited to, circles, ovals, hexagons, slits, rectangles, squares, diamonds, tapered holes (e.g., tapered circular apertures, tapered oval apertures, or tapered square apertures), etc. Additionally, the apertures 366 may be provided in a variety of sizes. For example, in the instance the apertures 366 are circular apertures (such as that shown in FIGS. 15 and 16), the apertures 366 may have a diameter between about 0.1 mm to about 5 mm, or between about 1 mm to about 3 mm, or may have a diameter that varies between about 0.1 mm to about 1 mm (e.g., in the instance the apertures 366 taper). Similar to the housing 102 of the pressure relief valve assembly 100, in various embodiments, the housing 302 may be constructed or molded as a separate piece from the flap 304 and the seal 306. For example, the housing 302 may be made or molded out of polypropylene (PP), acrylonitrile butadiene styrene (ABS), polyamide (PA), polyethylene (PE), polyethylene terephthalate (PET), polymethyl methacrylate (PMMA), polyoxymethylene (POM), polystyrene (PS), polyvinyl chloride (PVC), and/or combinations thereof.

Figure 18:
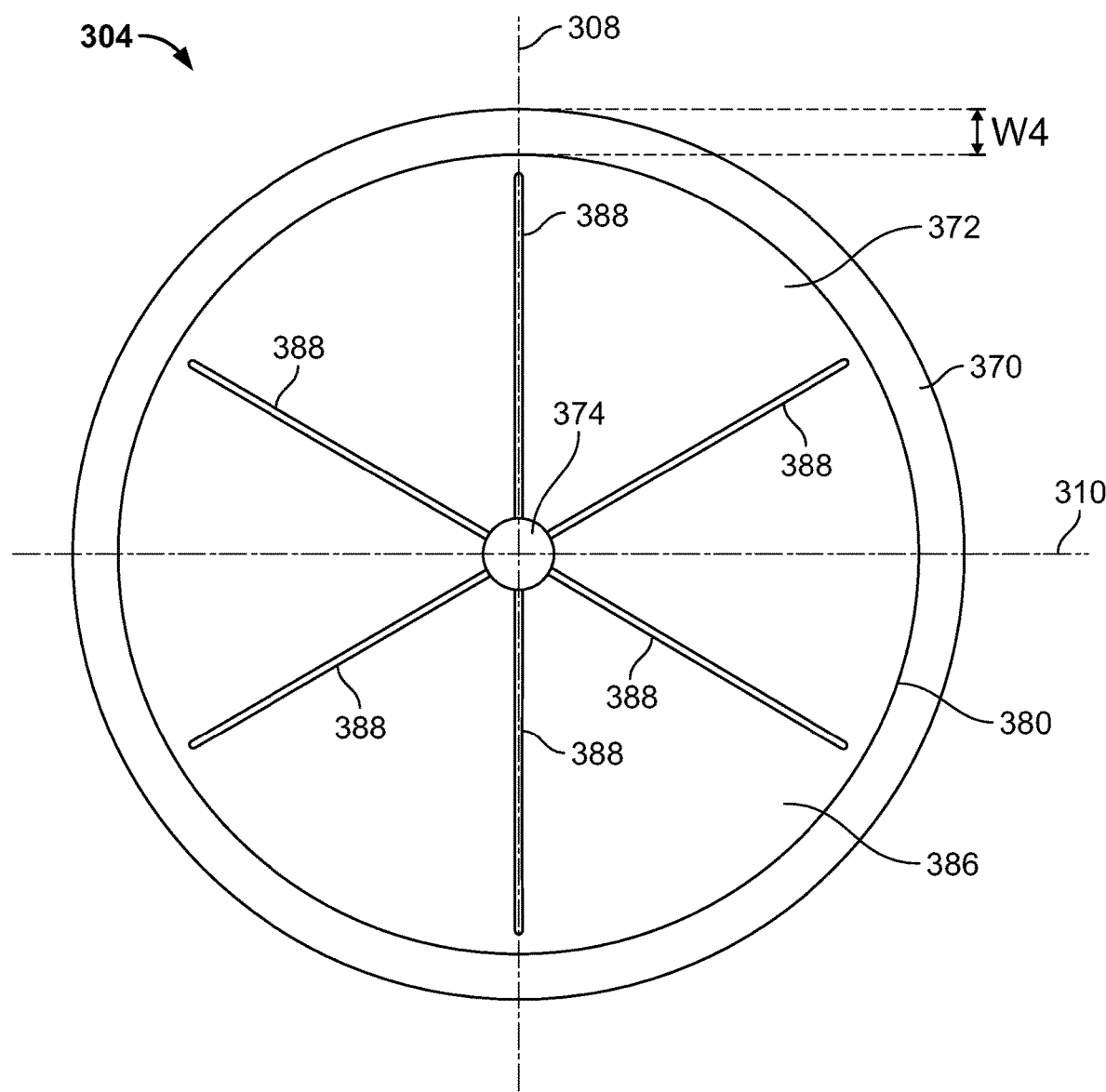
FIG. 18 is a top plan view of the flap of the pressure relief valve of FIG. 17.
Figure 19:
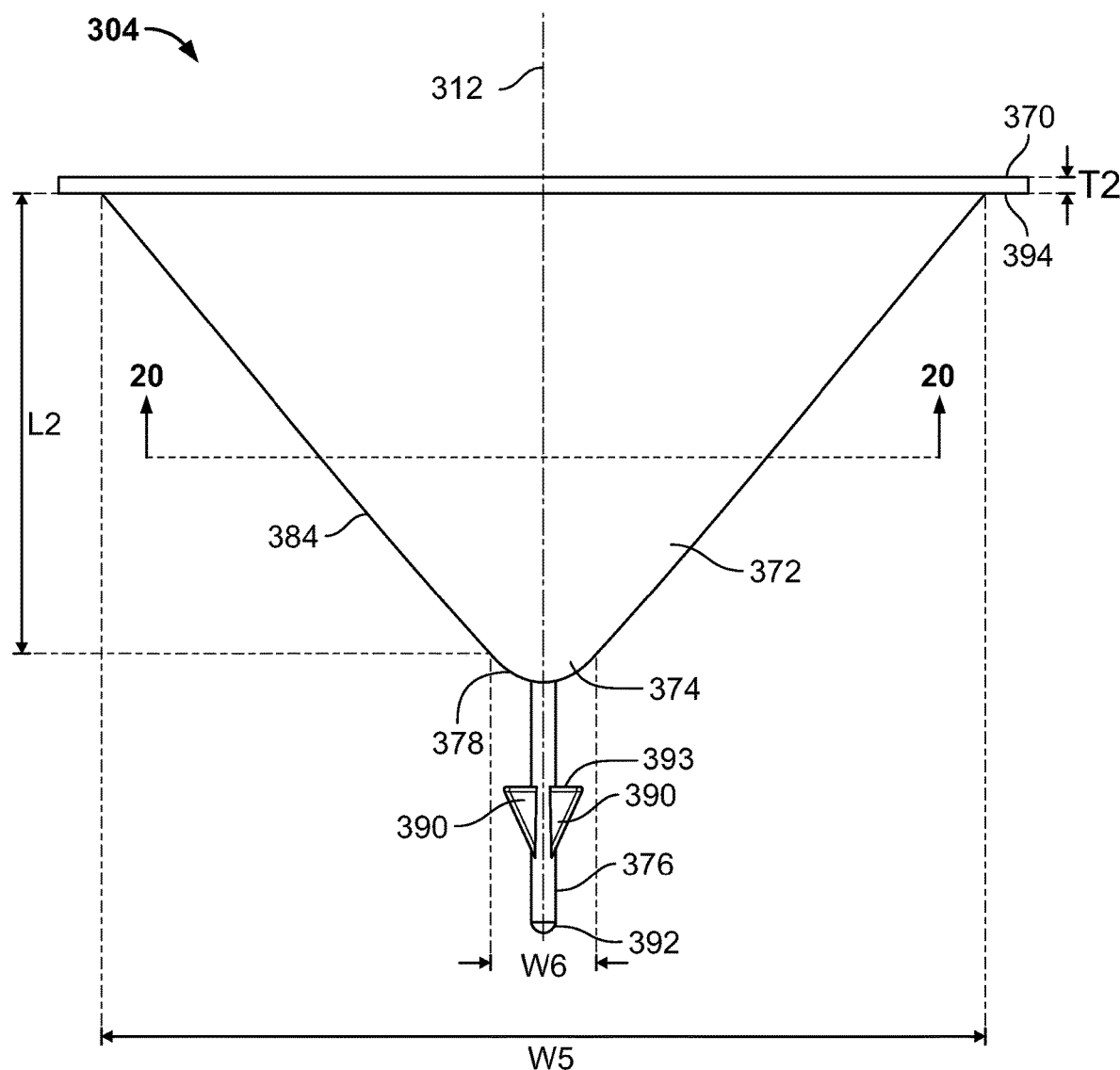
FIG. 19 is a side elevational view of the flap of FIG. 17.
Figure 20:
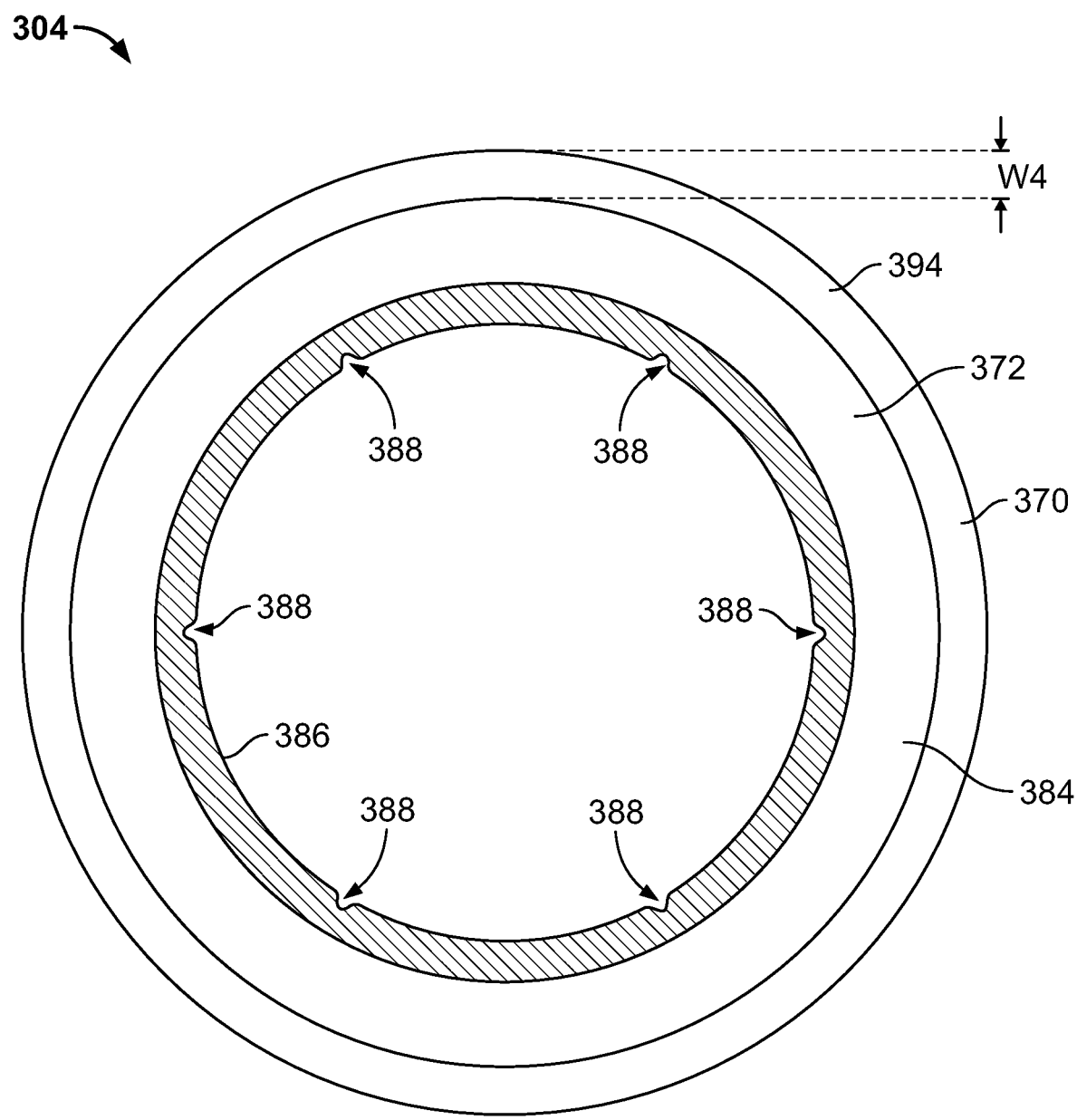
FIG. 20 is a cross-sectional view of the flap of FIG. 19, taken along line 20-20 thereof.

FIGS. 17-20 depict the flap 304, which is configured to be accepted by the housing 302 and contact the receptacle members 340 when the flap 304 is in a closed position. For example, FIGS. 11-13 depict the flap 304 in a closed position. In the illustrated embodiment shown in FIGS. 17-20, the flap 304 includes an upper flange 370, a tapered portion 372 that extends downwardly from the upper flange 370 toward a lower bowl 374, and a stem 376 that extends from an exterior surface 378 of the lower bowl 374 (see FIG. 19). The upper flange 370 is a peripheral extension that extends outwardly from an upper edge 380 of the tapered portion 372 and, as best shown in FIGS. 18-20, may have a thickness T2 (see FIG. 19) and a width W4 (see FIGS. 18 and 20). Further, the flange 370, in the illustrated example, is ring shaped and is configured to rest on or abut a top surface 382 of the upper peripheral rim 320 of the housing 302 when the flap 304 is disposed within the housing 302, as shown in FIG. 11.

The tapered portion 372 has a maximum width W5 (see FIG. 19) when proximate to the upper flange 370, tapers inwardly toward the lower bowl 374 or stem 376, and has a minimum width W6 (see FIG. 19) when proximate to the lower bowl 374 or stem 376. In the particular embodiment shown herein, the tapered portion 372 is configured as a cone having a length L2 (see FIG. 19) which defines the length between the maximum width W5 and the minimum width W6. Further, the tapered portion 372 is configured as a cone having the length L2 and a rate of taper or slope configured to allow the tapered portion 372 to sit in the interior volume or receiving space 346 defined by the receptacle members 340 with an exterior surface 384 of the tapered portion 372 resting against the receptacle members 340 when the flap 304 is in a closed position to prevent passage of air through the openings 342. Although, the flap 304 has a tapered conical configuration in the present embodiment, it should be appreciated that the flap 304 may have alternative configurations. In other embodiments, the flap 304 and, more particularly, the tapered portion 372 of the flap 304, has a shape that mimics the interior volume of the housing 302, which is defined by the receptacle members 340. In other words, the tapered portion 372 has a shape that corresponds to the tapered shape of the receptacle members 340, or the receptacle members 340 may define the tapered portion 372 of the flap 304. For example, in the embodiment where the receptacle members 340 have a tapered pyramid shape, the tapered portion 372 of the flap 304 may similarly include a tapered pyramid shape.

With particular reference to FIGS. 11, 14, 17, 18, and 20, an interior surface 386 of the tapered portion 372 may include one or more troughs 388. Further, the troughs 388 may be distributed around and may extend along the interior surface 386 of the tapered portion 372. As best shown in FIG. 20, in this particular embodiment, the troughs 388 are recessed into the interior surface 386 of the tapered portion 372 and, resultantly, are recessed surfaces or valleys within the interior surface 386. The troughs may be proximate to and may extend from the upper edge 380 of tapered portion 372, and may extend to and be proximate to the lower bowl 374 of the flap 304. During use, as will be further discussed herein, the troughs 388 are configured to help improve folding and/or bending of the flap 304 at a desired pressure. In this particular embodiment, the flap 304 includes six troughs 388 evenly spaced around the interior surface 386. However, in alternative embodiments, the flap 304 may include any number of troughs 388 and, in particular, the number of troughs 388 may be dependent on the particular use of the pressure relief valve assembly 300 and/or the particular shape or shape of the flap 304. For example, a greater number of troughs 388 may be desired if the surface area of the interior surface 386 of the tapered portion 372 is increased.

As shown in FIGS. 12-14, 17, and 19, the flap 304 also includes a stem 376. The stem 376 may extend outwardly from the exterior surface 378 of the lower bowl 374 of the tapered portion 372 or, put differently, the stem 376 may be disposed along the central axis 312 (see FIG. 19) at the narrowest portion of the flap 304. Further, the stem 376 includes one or more projections 390, which in this embodiment are triangular or arrowhead shaped projections that are proximate a medial or intermediate portion along the stem 376. As such, during use, a distal end 392 of the flap 304 may be aligned with and urged through the junction opening 348 until upper edges 393 of the projections 390 pass through the junction opening 348. Once the upper edges 393 of the projections 390 passes through the junction opening 348, the upper edges 393 may engage, be flush with, or come into contact with the distal surface 350 of the central junction 344 (see FIGS. 12 and 13). Resultantly, the flap 304 is secured to, or in engagement with, the housing 302. At this point, the tapered portion 372 is seated within the interior volume or receiving space 346 defined by the receptacle members 340, the exterior surface 384 of the tapered portion 372 rests against the receptacle members 340, and a bottom surface 394 of the upper flange 370 rests on or abuts against a top surface 396 of the interior rim 328 of the flange 316.

In various embodiments, the flap 304 is molded as a separate piece and assembled via press fit or snap fit onto the housing 302 (e.g., via stem 376). The flap 304 may be made of, for example, a thermoplastic elastomer material, such as a thermoplastic vulcanizate (TPV), with a hardness selected as appropriate for the requirements of a particular application. Generally, the flap 304 may be used to keep water and air from entering a cabin of a vehicle, but upon a door slam (or other event raising the pressure within the cabin a given amount) the flap 304 acts to allow air to exit the vehicle interior.

As will be discussed herein, once assembled with the housing 102, 302, the flap 104, 304 may be resiliently biasable between a closed position and an open position to allow passage of air through the openings 150, 342, the apertures 164, 366, and/or the opening 124, 324 of the pressure relief valve assembly 100, 300. The pressure relief valve 100, 300 may be in the closed position when the tapered portion 168, 372 is seated within the interior volume or receiving space 158, 346, the exterior surface of the tapered portion 168, 372 rests against the receptacle members 132, 340, and/or the bottom surface 196, 394 of the upper flange 166, 370 rests on or abuts against the top surface 178, 382 of the housing 102, 302. The pressure relief valve assembly 100, 300 may be in the open position when at least a portion of the flap 104, 304 biases or bends inwardly away from the receptacle members 132, 340 and/or the flange 122, 316 of the housing 102, 302.

Further, as discussed herein, the flap 104, 304 may be secured to, or in engagement with, the housing 102, 302. As such, when the flap 104, 304 transitions between a closed state and an open state, the housing 102, 302 (or components thereof) may also bias. In particular, in some embodiments, the receptacle members 132, 340 (or the central junction 156, 344) may be biased toward (or be in closer proximity to), the interior rim 152, 328 in an open state and may be biased away from (or farther away from), the interior rim 152, 328 in a closed state.

Additionally, as previously discussed herein, the configuration of the flap 104, 304 (e.g., size, shape, thickness, and material used therefor) may be selected so that the tapered flap 104, 304 is flexible enough to bias inwardly under a desired pressure at which the pressure relief valve assembly 100, 300 is designed to allow passage of air, but resilient and rigid enough to return to the closed position when exposed to a lower air pressure (e.g., a desired cabin pressure).

In some embodiments, the flange 166, 370 of the flap 104, 304 may have a width W1, W4 between about 0.1 mm and about 10 mm, between about 0.1 mm and about 5 mm, or between about 1 mm and about 3 mm. The flange 166, 370 may also have a thickness T1, T2 between about 0.1 mm and about 2 mm, between about 0.1 mm and about 1 mm, or between about 0.1 and about 0.5 mm. In further embodiments, the tapered portion 168, 372 of the flap 104, 304 may have a maximum width W2, W5 between about 50 mm and about 500 mm, between about 50 mm and about 300 mm, or between about 100 mm and about 200 mm; a minimum width W3, W6 between about 1 mm and about 300 mm, between about 20 mm and about 100 mm, or between about 40 mm and about 60 mm; and a length L1, L2 between about 10 mm and about 300 mm, between about 30 mm and about 200 mm, or between about 50 mm and about 100 mm.

With particular reference to FIG. 13, the housing 302 may be characterized by a width W7, which is measured from an upper edge of the flange 316 and to a lower edge of the flange 316. Similarly, the housing 102 may also be characterized by a width measured from an upper edge of the ring 116 to a lower edge of the ring 116. In particular embodiments, the width W7 (as well as the width of the housing 102), may be between about 100 mm and about 800 mm, between about 100 mm and about 500 mm, or between about 100 mm and about 300 mm.

Further, the housing 302 may have a length L3, which is measured from the upper brim 338 of the upper peripheral rim 320 and to the distal surface 350 of the central junction 344. Similarly, the housing 102 may also be characterized by a length measured from the top surface 178 of the upper peripheral extension 118 and to the distal end 194 of the central junction 156. In particular embodiments, the length L3 (as well as the length of the housing 102), may be between about 10 mm and about 500 mm, between about 30 mm and about 300 mm, or between about 50 mm and about 200 mm.

Figure 21:
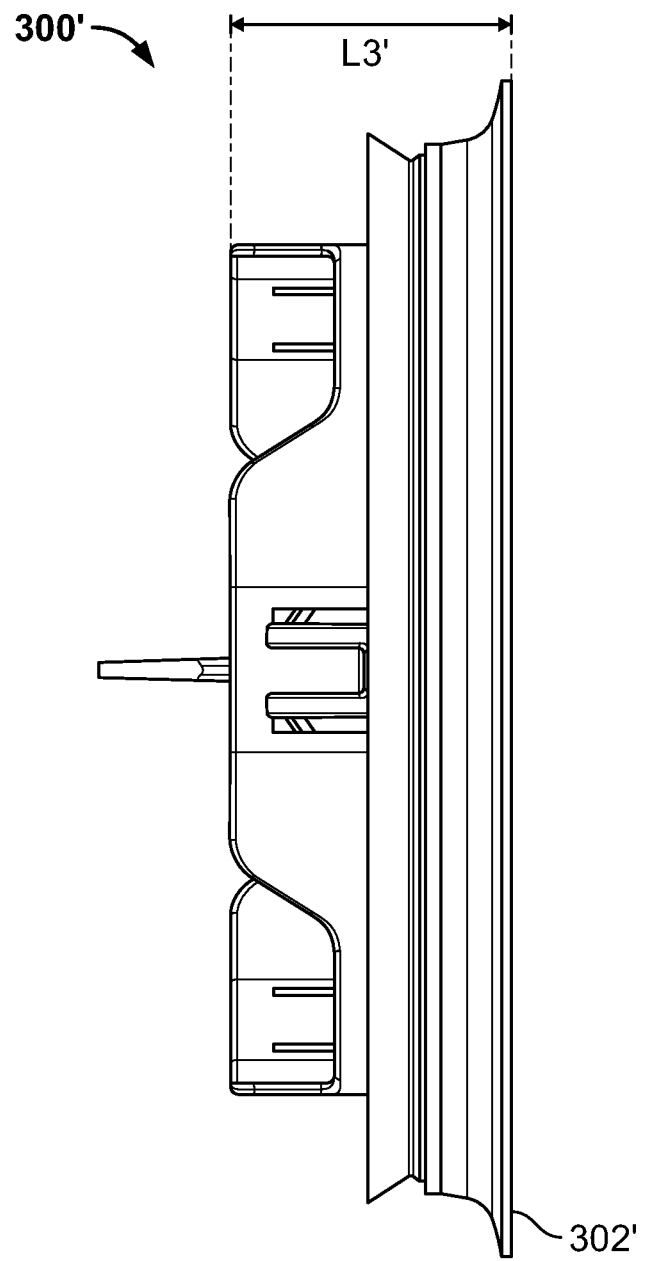
FIG. 21 is a side elevational view of an alternative embodiment of the pressure relief valve of FIG. 11.

In particular embodiments, the lengths L1, L2, L3, the widths W1, W2, W3, W4, W5, W6, W7, and/or the thicknesses T1, T2, of the housing 102, 302 and/or the flap 104, 304 of the pressure relief valve 100, 300 may be changed or tuned based on the particular use of the pressure relief valve assembly 100, 300. More particularly, the dimensions of the pressure relief valve 100, 300 may be tuned based on the particular force requirements desired. For example, FIG. 21 depicts another embodiment of a pressure relief valve assembly 300' having a housing 302' with a length L3' that is smaller than the length L3 of the housing 302 of the pressure relief valve assembly 300.

While various spatial and directional terms, such as top, bottom, lower, mid, lateral, horizontal, vertical, front, rear, and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

The term "about," as used herein, refers to variation in the numerical quantity that may occur, for example, through typical measuring and manufacturing procedures for embodiments of the disclosure herein. Throughout the disclosure, the terms "about" refer to a range of values ±5% of the numeric value that the term precedes.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

As noted previously, it will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

INDUSTRIAL APPLICABILITY

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

We claim:

1. A pressure relief valve, comprising:
   a housing including a housing flange and a plurality of receptacle members with openings therebetween; and
   a flap configured to be accepted by the housing and to contact the receptacle members in a closed position,
   wherein the flap covers the openings and inhibits airflow through the openings in the closed position,
   wherein the flap is biasable to allow airflow through the openings in an open position,
   wherein the housing flange circumscribes the housing and comprises two sections connected at an angle forming an interior rim of the housing,
   wherein the interior rim comprises a plurality of apertures therethrough, wherein the plurality of apertures are positioned solely on the interior rim and circumscribe a circumference of the interior rim, and
   wherein the flap comprises a flap flange that engages the housing flange of the housing when in the closed position and a tapered portion extending downwardly from the flap flange such that the flap contacts the interior rim, covers the apertures, and inhibits airflow through the apertures in the closed position, and the apertures are exposed in the open position.

2. The pressure relief valve of claim 1, wherein the tapered portion of the flap rests against the receptacle members in the closed position.

3. The pressure relief valve of claim 1, wherein the flap flange of the flap is spatially separated from the housing flange of the housing in the open position.

4. The pressure relief valve of claim 1, wherein the flap includes a plurality of troughs on an interior surface thereof.

5. The pressure relief valve of claim 4, wherein a distance between the troughs in the closed position is different than a distance between the troughs in the open position.

6. The pressure relief valve of claim 1, wherein the plurality of apertures are unevenly spaced around the interior rim.

7. The pressure relief valve of claim 1, wherein the plurality of apertures are evenly spaced around the interior rim.

8. The pressure relief valve of claim 6, wherein the plurality of apertures comprises a first set apertures that extends on a first arc of the interior rim and a second set of apertures that extends on a second arc of the interior rim, wherein the first arc is opposite from the second arc, and portions of the interior rim having no apertures extend between the first arc and the second arc.

* * * * *